(12) United States Patent
Kawai et al.

(10) Patent No.: US 7,718,099 B2
(45) Date of Patent: May 18, 2010

(54) FINE CHANNEL DEVICE, FINE PARTICLE PRODUCING METHOD AND SOLVENT EXTRACTION METHOD

(75) Inventors: Akira Kawai, Kanagawa-Ken (JP); Koji Kitayama, Kanagawa-Ken (JP); Toru Futami, Kanagawa-Ken (JP); Katsuyuki Hara, Kanagawa-Ken (JP); Tomohiro Ohkawa, Kanagawa-Ken (JP); Keiichiro Nishizawa, Kanagawa-Ken (JP); Hideaki Kiriya, Kanagawa-Ken (JP); Hirotatsu Kusakabe, Tokyo (JP)

(73) Assignee: Tosoh Corporation, Shunan-shi (JP)

( * ) Notice: Subject to any disclaimer, the term of this patent is extended or adjusted under 35 U.S.C. 154(b) by 487 days.

(21) Appl. No.: 10/420,854

(22) Filed: Apr. 23, 2003

(65) Prior Publication Data
US 2003/0201022 A1    Oct. 30, 2003

(30) Foreign Application Priority Data

Apr. 25, 2002  (JP)  ............... 2002-123835
May 30, 2002   (JP)  ............... 2002-158093
Aug. 6, 2002   (JP)  ............... 2002-228470

(51) Int. Cl.
*B29B 9/00*     (2006.01)
(52) U.S. Cl. ............... 264/11; 425/6; 138/40; 422/199; 422/186.3
(58) Field of Classification Search ............... 137/833, 137/806, 807, 834, 3; 204/601; 138/40, 138/42, 44; 366/181.5, 337, 338, 341; 264/5, 264/11; 425/6, 10; 422/129, 130, 198, 199, 422/224, 256, 257, 259, 261, 285, 186.3
See application file for complete search history.

(56) References Cited

U.S. PATENT DOCUMENTS 3,806,408 A  *  4/1974  Grant et al. ............... 376/246

(Continued)

FOREIGN PATENT DOCUMENTS

EP     1 250 954     10/2002

(Continued)

OTHER PUBLICATIONS

H. Hisamoto, et al., Chem. Commun., pp. 2662-2663, "Fast and High Conversion Phase-Transfer Synthesis Exploiting the Liquid—Liquid Interface Formed in a Microchannel Chip", 2001.

(Continued)

*Primary Examiner*—Stephen Hepperle
*Assistant Examiner*—Craig M Schneider
(74) *Attorney, Agent, or Firm*—Oblon, Spivak, McClelland, Maier & Neustadt, L.L.P.

(57) ABSTRACT

A fine channel device capable of producing fine particles in an industrial scale, hardening the fine particles immediately after the production and recovering the fine particles from a medium without collapsing the shape of the produced fine particles, a fine particle producing method using the fine channel device and a solvent extraction method using the fine channel, are presented. The fine channel device comprises a fine channel provided with an inlet port and an inlet channel which feed a dispersion phase, an inlet port and an inlet channel which feed a continuous phase, and an outlet channel and an outlet port which discharge fine particles produced by the dispersion phase and the continuous phase, wherein the inlet channel for feeding the dispersion phase and the inlet channel for feeding the continuous phase are joined at an arbitrary angle, and the two inlet channels are connected to the outlet channel at the arbitrary angle.

18 Claims, 18 Drawing Sheets

U.S. PATENT DOCUMENTS

| | | | |
|---|---|---|---|
| 4,092,013 A * | 5/1978 | Staaf | 366/165.4 |
| 5,524,660 A * | 6/1996 | Dugan | 137/14 |
| 5,869,004 A | 2/1999 | Parce et al. | |
| 5,921,678 A * | 7/1999 | Desai et al. | 366/336 |
| 5,957,579 A * | 9/1999 | Kopf-Sill et al. | 366/340 |
| 6,264,401 B1 * | 7/2001 | Langner et al. | 405/169 |
| 6,622,746 B2 * | 9/2003 | Yang et al. | 137/4 |
| 6,725,882 B1 * | 4/2004 | Shia et al. | 137/827 |
| 2003/0201022 A1 | 10/2003 | Kawai et al. | |
| 2004/0011413 A1 | 1/2004 | Fujii et al. | |
| 2004/0068019 A1 | 4/2004 | Higuchi et al. | |

FOREIGN PATENT DOCUMENTS

| | | |
|---|---|---|
| EP | 1 362 634 A1 | 11/2003 |
| GB | 1 446 123 | 8/1976 |
| JP | 62-64863 | 3/1987 |
| JP | 63-123817 | 5/1988 |
| JP | 04-244808 | 9/1992 |
| JP | A 6 001854 | 1/1994 |
| JP | A 6-071159 | 3/1994 |
| JP | 2975943 | 11/1999 |
| JP | 2000-15070 | 1/2000 |
| JP | A 2000-298109 | 10/2000 |
| JP | 2002-1102 | 1/2002 |
| JP | A 2002-001102 | 1/2002 |
| JP | A 2002-045666 | 2/2002 |
| JP | 2002-282678 | 10/2002 |
| JP | 2003-001077 | 1/2003 |
| WO | WO96/12194 | 4/1996 |
| WO | WO96/12541 | 5/1996 |
| WO | WO99/22857 | 5/1999 |
| WO | WO 01/08799 | 2/2001 |
| WO | WO 01/64331 | 9/2001 |
| WO | WO 01/64332 | 9/2001 |
| WO | WO 02/068104 | 9/2002 |
| WO | WO 02/085329 | 10/2002 |
| WO | WO 03/037502 | 5/2003 |

OTHER PUBLICATIONS

T. Nishisako, Preliminary papers for lectures in the $4^{th}$ chemical and microsystem society, "Production of Fine Droplets in Liquid in Microchannel", 2001 (with English Abstract).

Kikutani, et al., Preliminary papers for lectures in the $3^{rd}$ chemical microsystem society, "Synthesis in High Yeild Microchannels of Pile-Up Microreactor", 2001 (with English Abstract).

"Innovative Technology in Micro Chemical Reactor", New Technology Presentation Meetings Technical Information, Japan Science and Technology Agency, Mar. 4, 2002, pp. 12 -16.

"Droplet Formation in a Microchannel Network", Takasi Nisisako, Toru Torii, and Toshiro Higuchi, pp. 24-26, *Lab on a Chip* Journal of The Royal Society of Chemistry, Jan. 18, 2002 http://www.rsc.org/delivery/ArticleLinking/DisplayArticleForFree.cfm?doi=b108740c&JournalCode=LC.

L. Mészáros, et al., Fette, Seifen, Anstrichmittel, vol. 70, No. 12, XP-002095576, pp. 940-941, "Kontinuierlich Arbeitende Fadenreaktoren Für Mikropräparative Zwecke", 1968.

* cited by examiner

A-A' cross section

B-B' cross section

Fig. 14 (a)
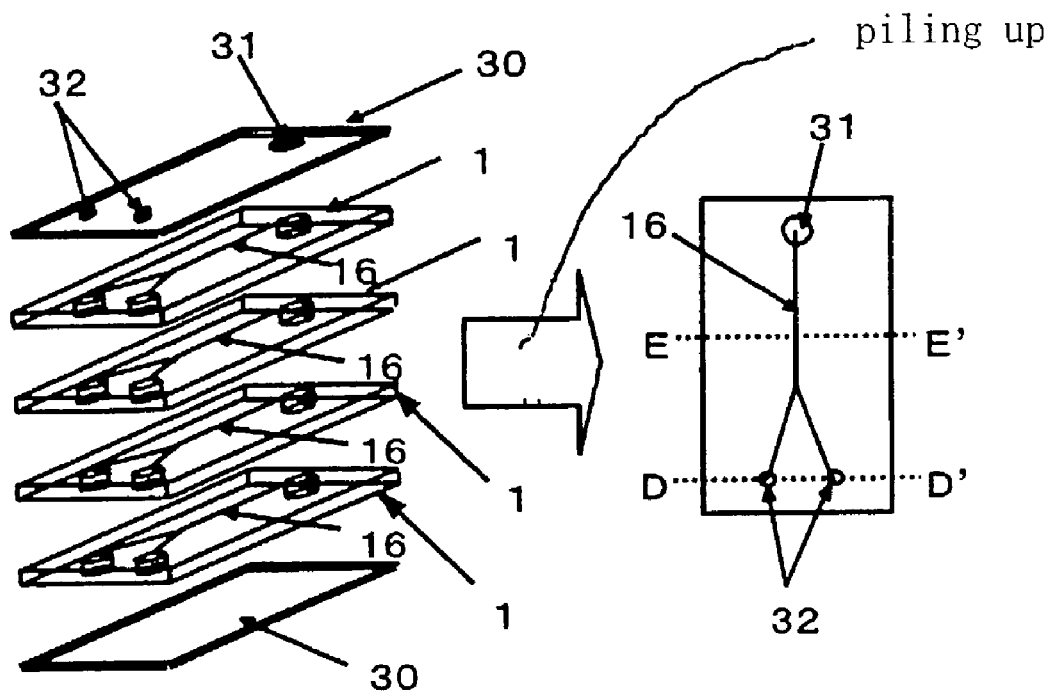
piling up
Fig. 14 (b)
DD' cross section
Fig. 14 (c)
EE' cross section
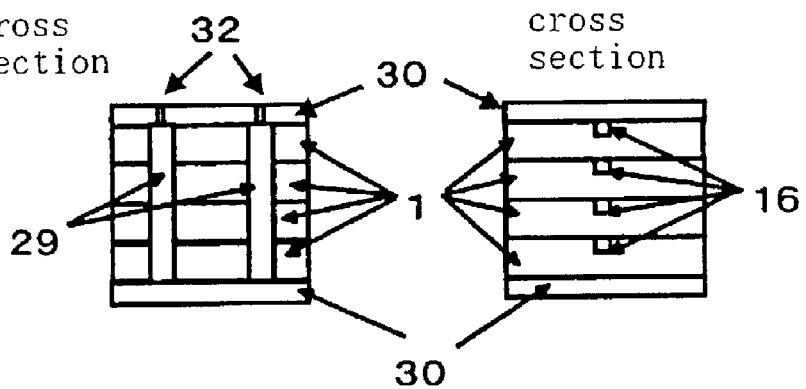

F-F' cross section

G-G' cross section

H-H' cross section

M-M' cross section

F i g. 29 (a)
F i g. 29 (b)
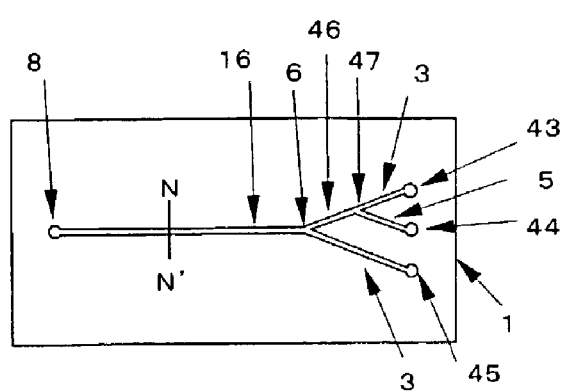
N-N' cross section

FINE CHANNEL DEVICE, FINE PARTICLE PRODUCING METHOD AND SOLVENT EXTRACTION METHOD

CROSS REFERENCE TO RELATED APPLICATIONS

This application is based upon and claims priority under 35 U.S.C. §119 from Japanese Patent Application Nos. 2002-123835, filed Apr. 25, 2002, 2002-158093, filed May 30, 2002, and 2002-228470, filed Aug. 6, 2002.

The present invention relates to a method for producing fine particles used for a packing material for a batching/separating column, microcapsules used for medicines, capsulated enzymes, cosmetics, fragrant materials, display/recording materials, adhesives, agrichemicals etc. or fine particles used for chemical reaction, solvent extraction etc., a method of use of them, and a fine channel device for producing such fine particles.

In recent years, research for causing a chemical reaction or producing fine particles by using a fine channel device comprising a glass substrate of several cm square provided with a fine channel having a length of several cms and a width and a depth of from sub-μm to several hundred μm wherein fluid is fed to the fine channel, has been noted. The fine particles referred to in this text include fine droplets, fine particles in a state of fine droplets wherein only their surface portion is hardened (hereinbelow, referred to as "partially hardened") or fine particles in a semisolid state having a very high viscosity other than fine particles in a solid state. Such fine channel has suggested to be used for a very efficient chemical reaction due to effects of a short diffusion distance of molecule and a large specific interfacial area in a fine space (see, for example, a non-patent document 1 by H. Hisamoto et. al. "Fast and high conversion phase-transfer synthesis exploiting the liquid-liquid interface formed in a microchannel chip" Chem. Commun., published in 2001, 2662–2663 pages).

Further, fine particles having very uniform particle size can be produced by feeding two kinds of liquid having different interfacial tensions into channels having a confluent portion (see, for example, a non-patent document 2: "production of fine droplets in liquid in microchannel", p. 59, preliminary papers for lectures in the 4 th chemical and microsystem society, by Takashi Nishisako, published in 2001) and a patent document 1: Japanese Patent No. 2975943). The non-patent document 2 shows a T-letter like fine channel device comprising a fine channel substrate 1 in which a continuous phase inlet port 2, a continuous phase inlet channel 3, a dispersion phase inlet port 4, a dispersion phase inlet channel 5, an outlet channel 7 and an outlet port 8 are formed wherein a confluent portion 6 is formed in a portion at which introduced continuous phase and dispersion phase join, as shown in FIG. 1(a). In the T-letter like fine channel, the depth of each channel is 100 μm, the width of the inlet channel for feeding the dispersion phase is 100 μm and the width of the inlet channel for feeding the continuous phase is from 300 to 500 μm. When the supply of fluid is carried out by using the T-letter like fine channel while flow rates of the dispersion phase and the continuous phase are controlled, it is possible to produce very uniform fine particles at the confluent portion. Further, it is possible to control the particle size of fine particles to be produced by controlling flow rates of the dispersion phase and the continuous phase.

However, the above-mentioned technique used a fine channel in which the width of the inlet channel for the continuous phase was 3 to 5 times wider than the width of the inlet channel for the dispersion phase. Accordingly, when the dispersion phase and the continuous phase are fed at the same flow rate, the linear velocity of the dispersion phase in the inlet channel having a narrower width is fast so that the dispersion phase and the continuous phase form a laminar flow in the downstream of the confluent portion. As a result, there was a problem of difficulty in producing fine particles at the confluent portion.

To overcome such problem, it is necessary to supply the continuous phase excessively. However, when the production of fine particles was conducted in an industrial scale, it was necessary to increase the quantity of the continuous phase excessively in comparison with the quantity of the dispersion phase. This invited a problem of difficulty in cost reduction or the lowering of an amount of waste liquid.

Further, in the techniques proposed in the non-patent document 2 and the patent document 1, the production of composite capsules or multiple capsules was difficult, and the improvement of these techniques has been required.

Further, since the fine particles produced by the techniques proposed in the non-patent document 2 and the patent document 1 provide a relatively small fluctuation of particle size and a uniform particle size, an attempt that a chemical compound for forming the fine particles is hardened by cross-linked polymerization or the like to use the hardened fine particles as fine particles in a gel state having a uniform particle size, used for a packing material for a batching/separating column, has been made. However, when the produced fine particles were collected into a beaker at the outside of the fine channel and the fine particles were hardened by cross-linked polymerization, the shape of the fine particles was deformed in a time from the collection to the hardening of the fine particles, or the agglomeration of fine particles was resulted. Accordingly, the fluctuation of particle size of the hardened fine particles became large, and it was difficult to separate the fine particles before being hardened from a medium. Accordingly, improvement of these techniques has been required.

Further, an attempt of causing a chemical reaction in the fine channel or applying the fine particles to industrial production has been done by taking advantages of the fine space which allows an efficient chemical reaction due to effects of a short diffusion length of molecule and a large specific interfacial surface as described before, or allows the production of fine particles having uniform particle size by feeding two kinds of liquid having different interfacial tensions to channels having a confluent portion. In this case, the use of a single fine channel necessarily results a less yield per unit time due to the small fine space. However, if a large number of fine channels can be arranged in parallel, the yield per unit time can be obtained while the advantage of the fine channel can be taken (see, for example, a non-patent document 3: "Synthesis in high yield microchannel of pile-up micro-reactor", preliminary papers for lectures in the 3rd chemical.micro system society, by Kikutani et. al., p. 9, published in 2001). The non-patent document 3 proposes that microchannel substrates 1 having a single microchannel are piled up wherein common portions such as inlet ports for a reaction solution and outlet ports for a reacted product are connected by vertically penetrated holes. It can be considered that the degree of accumulation of fine channels each being the minimum unit can be increased two-dimensionally, or three-dimensionally by a piling-up technique in order to achieve chemical synthesis or produce fine particles in a large quantity while the advantage of the fine space is taken. However, it is very difficult to distribute uniformly fluid to fine channels arranged two dimensionally or three-dimensionally, and the improvement is required.

The non-patent document 1 suggests that an efficient chemical reaction can be conducted, without a special stirring operation, due to prompt diffusion of molecules, which is resulted by a short diffusion length of molecule and a large specific interfacial area in a fine space, and a side reaction which may successively occur, can be suppressed by the fact that a chemical compound resulted from a chemical reaction can promptly be extracted and separated from a reaction phase to an extraction phase.

In the techniques described in the above-mentioned documents, a Y-letter like fine channel 16 as shown in FIG. 2(*a*) is used. An organic phase 12 in which a raw material dissolved and an aqueous phase 13 are fed to the Y-letter like fine channel 16 to conduct reaction or extraction at the boundary 14 between the organic phase and the aqueous phase, which is formed at a Y-letter like confluent portion. The Reynolds number is generally less than 1 in a channel in a microscale, and the two introduced phases provide a laminar flow as show in FIG. 2(*a*) unless flow rates of these phases are exceptionally increased. Further, since the diffusion time is in proportion to the second power of the width 9 of the fine channel, the mixing is accelerated by the diffusion of molecules, without positively mixing the reaction liquid, as the width of the fine channel is made more smaller, whereby reaction or extraction is apt to occur. Generally, a large specific interfacial surface provides a more efficient reaction or extraction. Here, the specific interfacial surface means the ratio of an interfacial area to the total volume of the phases when the interface is formed by the mutual contact of the phases. In reaction or extraction, a material can transfer to the other phase only through the interface. Accordingly, a large specific interfacial area means a highly efficient reaction or extraction being obtainable.

The method for calculating the specific interfacial area in a fine channel will be described by using FIG. 2(*b*) which is a stereoscopically cross-sectioned view obtained by cutting out a portion of a confluent portion in a Y-letter like channel. When the width 9 of the fine channel is expressed by W ($\mu$m), the unit length 24 of the fine channel is L ($\mu$m) and the depth 25 of the fine channel is d ($\mu$m), the total volume of the organic phase 12 is expressed by (W/2)×d×L ($\mu m^3$). Further, the area of the boundary 14 between the aqueous phase and the organic phase is expressed by d×L ($\mu m^2$). Accordingly, the specific interfacial area is expressed by (d×L) /{(W/2)×d×L}=$2 \times 10^4$/W ($cm^{-1}$) whereby it is understood that the specific interfacial area can be determined by only the width W of the fine channel irrespective of the length and the depth d of the fine channel. For example, the specific interfacial area under the condition that the width of the fine channel is 1000 ($\mu$m), is 20 ($cm^{-1}$). On the other hand, the specific interfacial area under the condition that the width of the fine channel is 100 ($\mu$m), is 200 ($cm^{-1}$). Accordingly, as the width of the fine channel is made more smaller, the specific interfacial area increases whereby an efficient chemical reaction or extraction is obtainable.

However, the efficiency of reaction or extraction across the laminar flow shown in FIG. 2(*a*) means conversely the shortening of diffusion time and the magnitude of the specific interfacial area of the fluid boundary, i.e., a restriction by the width of the fine channel. Namely, the diffusion time and the specific interfacial area of fluid boundary are determined by the width of the fine channel used for reaction or extraction, and the efficiency of reaction or extraction cannot be improved much more than the efficiency determined by the width of the fine channel. Further, although it is possible to increase the efficiency of reaction or extraction by making the width of the fine channel smaller whereby the diffusion time can further be shortened and the specific interfacial area can further be increased, as described above, the reduction of the width of the fine channel is not realistic because smaller the width of the fine channel is, larger the pressure loss is, and the liquid supply itself becomes difficult. Accordingly, there is a limit in reducing the width of the fine channel, and improvement is required.

A first problem in producing fine particles in a fine channel by the above-mentioned conventional techniques is that when uniform fine particles are to be produced at the confluent portion for a continuous phase and a dispersion phase in a fine channel, the dispersion phase and the continuous phase form a laminar flow, so that it is difficult to produce fine particles stably at the confluent portion.

A second problem of the conventional techniques is that it is necessary to supply the continuous phase excessively in order to produce fine particles at the confluent portion, whereby the cost reduction of the continuous phase for producing, for example, gel, industrial mass production or the production of fine particle per se becomes difficult.

A third problem is a requirement for producing composite capsules or multiple capsules.

A fourth problem is that when fine particles to be produced are fine droplets and the fine droplets are collected in a beaker at an outside of the fine channel, followed by hardening the fine droplets by cross-linked polymerization, the shape of the fine droplets is deformed in a time from the collection of the fine droplets to the hardening of them, or the fine droplets agglomerate each other whereby the fluctuation of the particle size of the hardened fine droplets became large. Further, it is difficult to separate the fine particles before hardening from a medium.

A fifth problem is that it is very difficult to arrange a plurality of fine channels two-dimensionally or three-dimensionally in the fine channel device and to distribute fluid uniformly to the fine channels.

A sixth problem is that it is impossible to improve the efficiency of reaction or extraction much more than the efficiency determined by the width of a fine channel.

SUMMARY OF THE INVENTION

It is an object of the present invention to provide a fine channel producing method capable of producing fine particles, composite capsules or multiple capsules in a fine channel, distributing fluid uniformly into a plurality of fine channels to realize industrial mass production, hardening fine particles immediately after producing them, without deforming the shape of the fine particles produced in a fine channel, and separating the fine particles from a medium, and a fine channel device for realizing such method.

Further, it is an object of the present invention to provide a method for producing gel or microcapsules.

Further, the present invention is to provide a solvent extraction method using the fine channel device by which a shortened diffusion time and the size of the specific interfacial area of the fluid boundary are improved much more than those determined by the width of the fine channel, and the efficiency of extraction in the fine channel can be improved much more than the efficiency determined by the width of the fine channel.

In accordance with the present invention, there is provided a fine channel device comprising a fine channel provided with an inlet port and an inlet channel which feed a dispersion phase, an inlet port and an inlet channel which feed a continuous phase, and an outlet channel and an outlet port which discharge fine particles produced by the dispersion phase and the continuous phase, characterized in that the inlet channel for feeding the dispersion phase and the inlet channel for feeding the continuous phase are joined at an arbitrary angle, and said two inlet channels are connected to the outlet channel at the arbitrary angle.

Further, in order to produce fine particles in a large quantity by arranging a large number of fine channels in parallel and/or in a vertical direction, there is provided a fine channel device comprising an inlet port for feeding fluid, an outlet port for discharging the fluid, a common channel formed in a substrate to communicate the inlet port with the outlet port, and at least one fine channel communicated with the common channel at positions different from the inlet port and the outlet port, characterized in that the cross-sectional area of the common channel is increased gradually from the portion where the inlet port is communicated with the common channel to the portion where the outlet port is communicated with the common channel, or unchanged.

Further, according to the present invention, there is provided a fine particle producing method for producing fine particles by using a fine channel device provided with an inlet port and an inlet channel which feed a dispersion phase, an inlet port and an inlet channel which feed a continuous phase, and an outlet channel and an outlet port which discharge fine particles produced by the dispersion phase and the continuous phase, characterized in that the dispersion phase is transformed into fine particles by being joined with the continuous phase.

In this case, the particle size of the fine particles is controlled by changing the angle at a confluent portion at which the inlet channel for feeding the dispersion phase and the inlet channel for feeding the continuous phase join.

Further, it is possible to produce microcapsules or fine particles in a form of gel by using the above-mentioned fine channel device.

Further, according to the present invention, there is provided a solvent extraction method characterized by using the fine channel device described above to form, in the fine channel, fine droplets from an extracting solvent or fluid containing a material to be extracted and causing the phase transfer of the material to be extracted between the dispersed phase composed of the droplets and the continuous phase which surrounds the fine droplets to conduct solvent extraction.

BRIEF DESCRIPTION OF THE DRAWINGS

In drawing:

FIG. 14(a) is a conceptual diagram showing an embodiment of the arrangement of fine channels for feeding fluid uniformly to a plurality of fine channels arranged in a two-dimensional form or a three-dimensional form wherein a plurality of fine channel substrates each having a fine channel are piled up and a common channel is formed to penetrate the fine channel substrates, FIG. 14(b) is a cross-sectional view taken along a line D–D' in FIG. 14(a), and FIG. 14(c) is a cross-sectional view taken along a line E–E' in FIG. 14(a);

FIG. 29(a) is a schematic view showing a fine channel according to Example 5, and FIG. 29(b) is an enlarged cross-sectional view taken along a line N–N' in FIG. 29(a);

FIG. 32 shows several embodiments how at least one projection is formed in a bottom, upper and/or side surface of a fine channel, wherein

DETAILED DESCRIPTION OF THE INVENTION

Figure 1A:
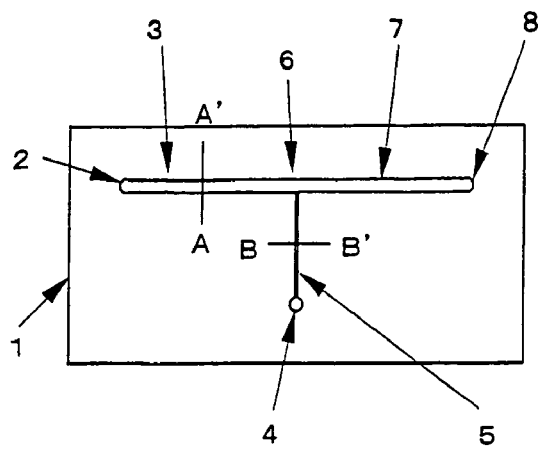
FIG. 1(a) is a schematic view showing a fine channel for producing fine particles according to a conventional technique.
Figure 1B:
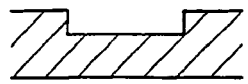
FIG. 1(b) is an enlarged cross-sectional view taken along a line A–A' in FIG. 1(a) and FIG. 1(c) is an enlarged cross-sectional view taken along a line B–B' in FIG. 1(a)
Figure 1C:

The present invention will be described in more detail.

(Fine Particle Producing Method)

Fine channels used in the present invention generally have a channel size wherein the width is 500 μm or less and the depth is 300 μm or less.

Fine particles in the present invention are fine particles produced by chopping a dispersion phase by a continuous phase in a fine channel. In the size of fine particles, the diameter of each fine particle is generally smaller than the width or the depth of the fine channel. For example, assuming that each fine particle is in a complete spherical body, the diameter of the fine particle produced in a fine channel having a width of 100 μm and a depth of 50 μm is smaller than 50 μm. Fine particles in the present invention include fine droplets, semi-hardened fine particles wherein only the surface of fine droplets is hardened, and fine particles in a semi-solid state having a very high viscosity, other than fine particles in a solid state.

A dispersion phase used in the present invention is a fluid medium for producing fine particles in a fine channel device, such as a monomer to be polymerized such as styrene, a cross-linking agent such as divinylbenzene or a medium obtained by dissolving a gel-producing material such as a polymerization initiator in an appropriate solvent. Since the present invention aims at producing fine particles efficiently, the dispersion phase is not particularly limited as far as it can be fed through a fine channel in the fine channel device, and the component for the dispersion phase is not in particular limited as far as it can form fine particles. Further, the dispersion phase may be in a slurry state wherein for example, a solid substance such as fine powder is mixed in the dispersion phase, or may constitute a laminar flow formed by a plurality kinds of fluid. Further, the dispersion phase may be a mixed fluid or emulsion formed by plural kinds of fluid.

A continuous phase used in the present invention is a fluid medium used for producing fine particles from the dispersion phase in the fine channel device. For example, the continuous phase may be a medium obtained by dissolving a gel-producing dispersant such as polyvinyl alcohol in an appropriate solvent. The continuous phase is not in particular limited as far as it can be fed to the fine channel in the fine channel device in the same manner as the dispersion phase, and the component is not in particular limited as far as it can form fine particles. Further, the continuous phase may be in a slurry state wherein a solid substance such as fine powder is mixed with the continuous phase, or may constitute a laminar flow formed by plural kinds of fluid. Further, the continuous phase may be a mixed fluid or emulsion formed by plural kinds of fluid. With respect to the composition of produced fine particles, when the outermost layer of each fine particle is composed of an organic phase, the outermost layer of the continuous phase is an aqueous phase, and when the outermost layer of each particle is an aqueous phase, the outermost layer of the continuous phase is an organic phase.

Further, it is preferable that the dispersion phase and the continuous phase are difficult to be dissolved with each other or have no compatibility in order to produce fine particles. For example, when an aqueous phase is used as the dispersion phase, an organic phase such as butyl acetate insoluble substantially to water should be used as the continuous phase. When an aqueous phase is used as the continuous phase, the dispersion phase should be used adversely.

In the fine particle producing method of the present invention, the dispersion phase and the continuous phase are fed to inlet channels in the fine channel device of the present invention, which will be described later, and fine particles are produced by chopping the dispersion phase by the continuous phase at the confluent portion at which both phases join. In this case, the particle size of produced fine particles can be controlled by changing the angle of the confluent portion at which an inlet channel for feeding the dispersion phase and an inlet channel for feeding the continuous phase join. This method can easily control the particle size of the produced fine particles in comparison with the conventional fine particle producing method using a fine channel device wherein rates for feeding the dispersion phase and the continuous phase are different. Therefore, the method according to the present invention is suitable for industrial mass production. In particular, when the rate of feeding the dispersion phase is substantially equal to the rate of feeding the continuous phase, it is sufficient to use only a single feeding device, which is advantageous in an aspect of cost. The meaning that the rate of feeding the dispersion phase is substantially equal to the rate of feeding the continuous phase is that there is no substantial influence to the particle size of fine particles to be produced even though there is a certain fluctuation in the feeding rate. Thus, it is possible to produce fine particles having uniform size in a stable manner without the necessity of feeding the continuous phase excessively. For example, the cost of the continuous phase for producing gel can be reduced, and industrial mass production becomes possible.

Figure 3:
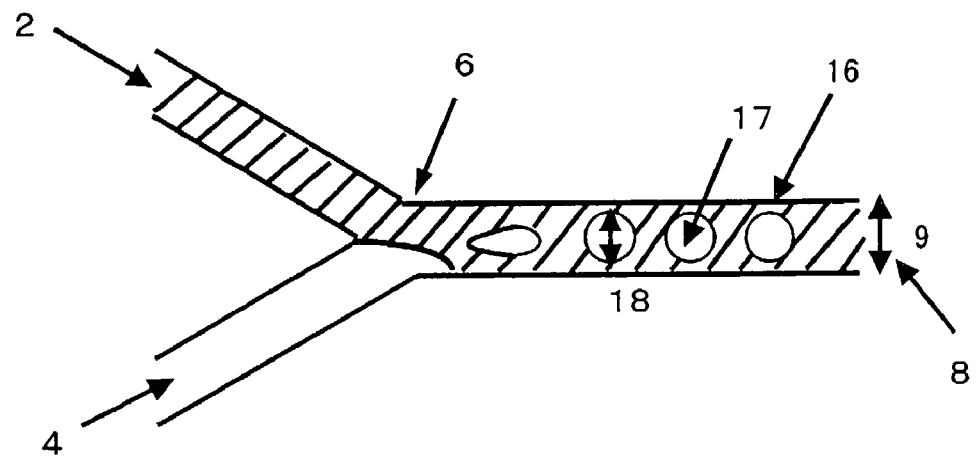
FIG. 3 is a conceptual diagram showing a method for forming fine particles by chopping a dispersion phase by a continuous phase in the vicinity of a confluent portion of a fine channel.
Figure 4:
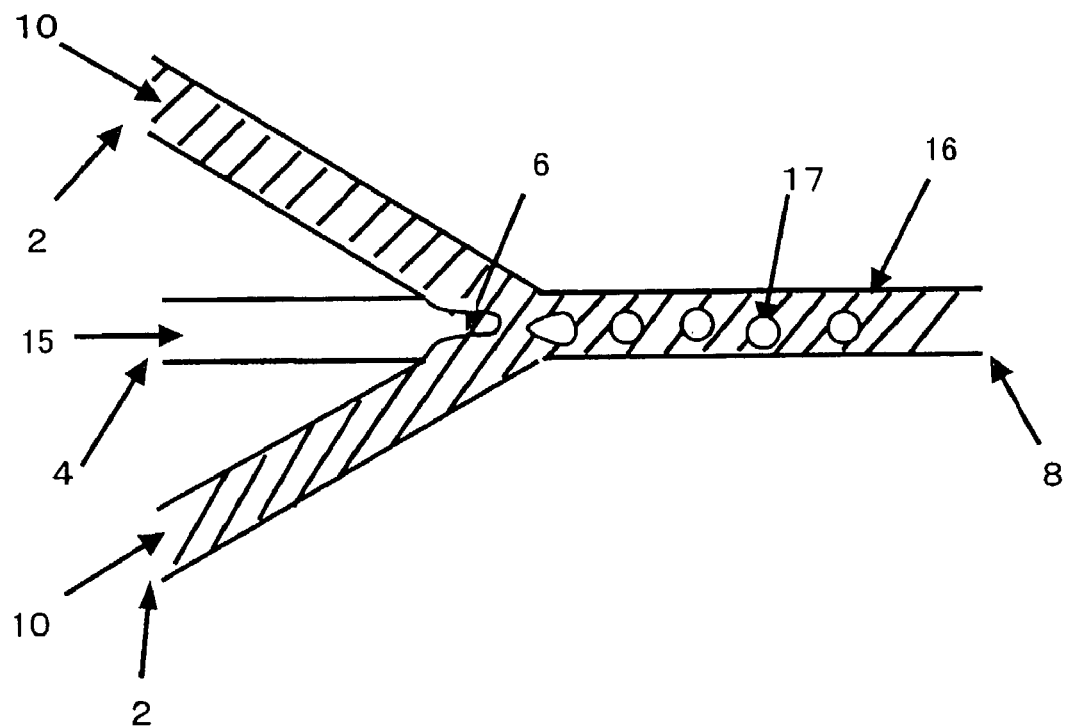
FIG. 4 is a conceptual diagram showing a method for forming fine particles by chopping a dispersion phase by two flows of continuous phase, which chop the dispersion phase from both sides, in the vicinity of a confluent portion of a fine channel.
Figure 5:
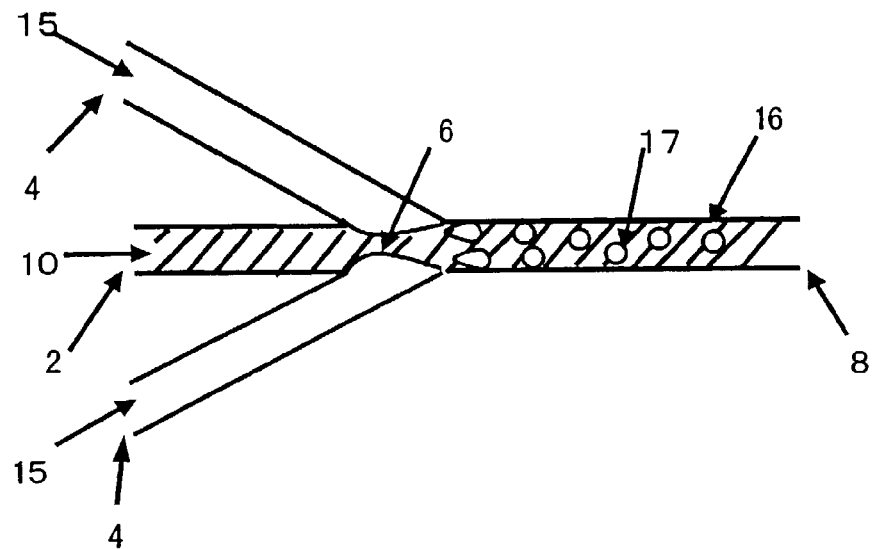
FIG. 5 is a conceptual diagram showing a method for forming fine particles by chopping two flows of dispersion phase flowing both sides with respect to a central continuous phase in the vicinity of a confluent portion of a fine channel.
Figure 6:
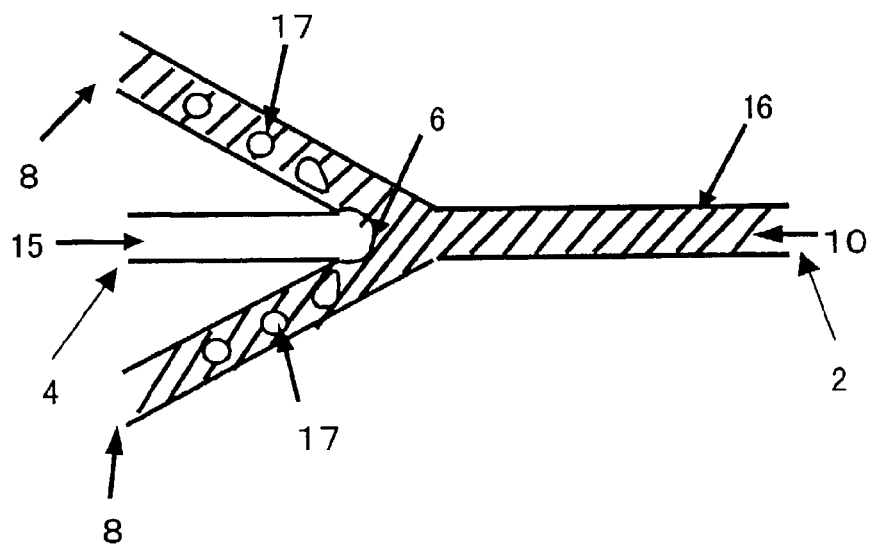
FIG. 6 is a conceptual diagram showing a method for feeding a dispersion phase linearly in a fine channel from one side; feeding a continuous phase from the other side to form fine particles by chopping the dispersion phase by the continuous phase in the vicinity of a confluent portion of the fine channel, and discharging the fine particles into an arbitrarily direction.
Figure 7A:
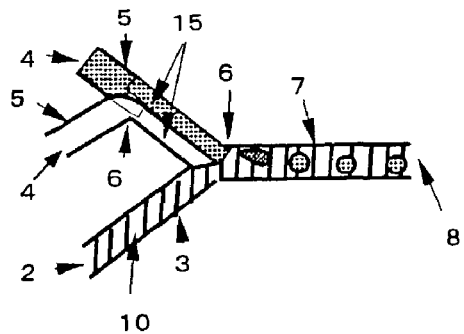
FIGS. 7(a) to 7(g) are conceptual diagrams showing methods for forming fine particles by providing one or a plurality of dispersion phase inlet channels for feeding a dispersion phase and one or a plurality of continuous phase inlet channels for feeding a continuous phase to let the dispersion phase and/or the continuous phase to be a plurality of laminar flows of fluid, a mixture or emulsion, and chopping the dispersion phase by the continuous phase in the vicinity of a confluent portion of the fine channel.
Figure 7B:
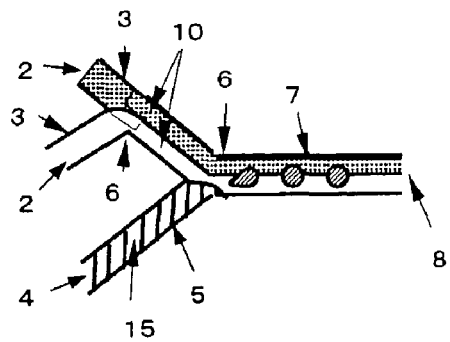
Figure 7C:
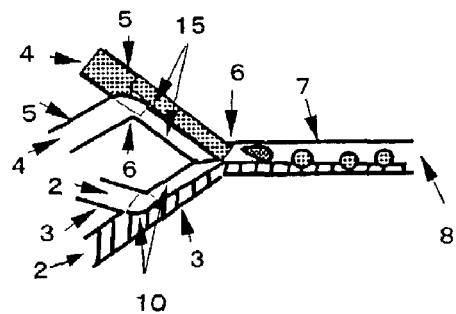
Figure 7D:
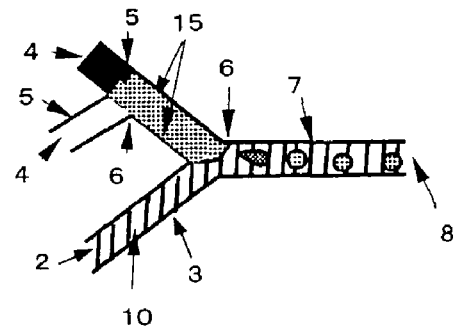
Figure 7E:
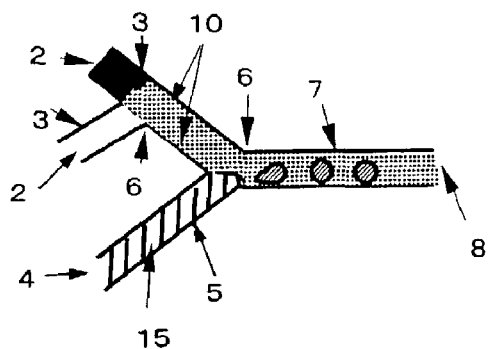
Figure 7F:
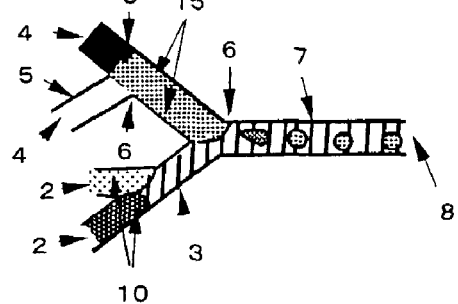
Figure 7G:
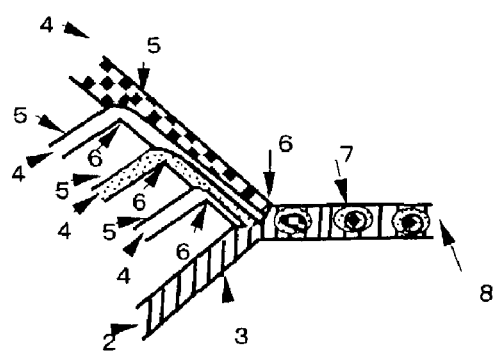

The basic system for joining a continuous phase and a dispersion phase according to present invention is shown in FIG. 3. In FIG. 3, the continuous phase is fed from a continuous phase inlet port 2 of a Y-letter like fine channel and the dispersion phase is fed from a dispersion phase inlet port 4 whereby fine particles 17 are produced by chopping the dispersion phase by the continuous phase at a confluent portion 6. However, the present invention is not limited to such system. As other systems, there is a system as shown in FIG. 4 that continuous phases 10 are fed so as to make the continuous phases contact with the dispersion phase 15 at a confluent portion 6 of the fine channel 16 whereby the dispersion phase 15 is chopped so that fine particles 17 are produced. There is another system as shown in FIG. 5 that at least two dispersion phases 15 are fed so as to make the dispersion phases 15 contact with the continuous phase 10 at a confluent portion 6 of the fine channel 16 whereby the dispersion phases are chopped by the continuous phase so that fine particles 17 are formed, or another system as shown in FIG. 6 that a dispersion phase is fed linearly from one side of the fine channel 16 and a continuous phase 10 is fed from the other side to join the dispersion phase and the continuous phase at a confluent portion 6 of the fine channel 16 whereby fine particles 17 are produced. The produced particles may be fed in an arbitrary direction or directions from the joined position to be discharged. Thus, fine particles can be produced more effectively. In the system shown in FIG. 6, fluid containing the produced fine particles is joined again to another fluid to obtain fine particles for recovery.

Further, as shown in FIGS. 7(a) to 7(g), one or a plurality of dispersion phase inlet channels 5 for feeding dispersion phases and one or a plurality of continuous phase inlet channels 3 for feeding continuous phases 10 may be provided so that the dispersion phases and the continuous phases form laminar flows composed of plural kinds of fluid, a mixed liquid or emulsion. According to each of the fine channels shown in FIGS. 7(a) to 7(g), fine particles of multi-layer structure or fine particles containing many different kinds of fine particles can be formed, or composite microcapsules or multiple microcapsules can be produced. Further, the continuous phase and/or the dispersion phase may contain fine powder.

Further, in the present invention, when fine particles produced at the confluent portion of the fine channel are fine droplets to be hardened, it is preferable to harden the fine droplets in and/or out the fine channel. Further, it is preferable that in order to form hardened fine particles having a uniform size, fine droplets are hardened continuously in a fine channel provided at the outside of the outlet port of the fine channel device after the fine droplets are discharged from the outlet port after having been passed through the outlet channel. In order to obtain cured fine particles having more uniform particle size, it is more preferable that the fine droplets are hardened in the fine channel, i.e., in the outlet channel of the fine channel device immediately after they are produced at the confluent portion of the fine channel.

Figure 8A:
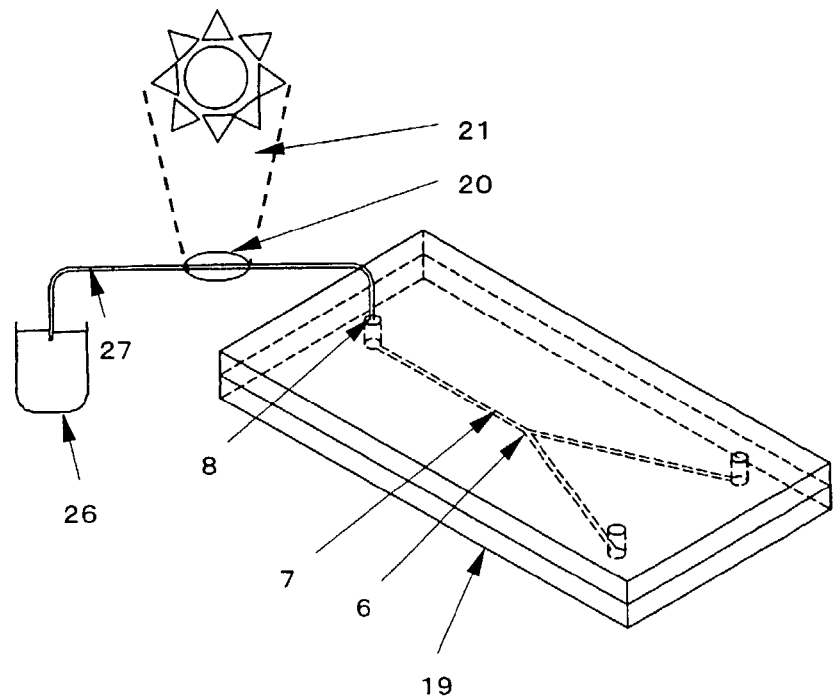
FIG. 8(a) is a schematic diagram showing a method for hardening fine particles by the irradiation of light from a light irradiation means disposed outside.
Figure 8B:
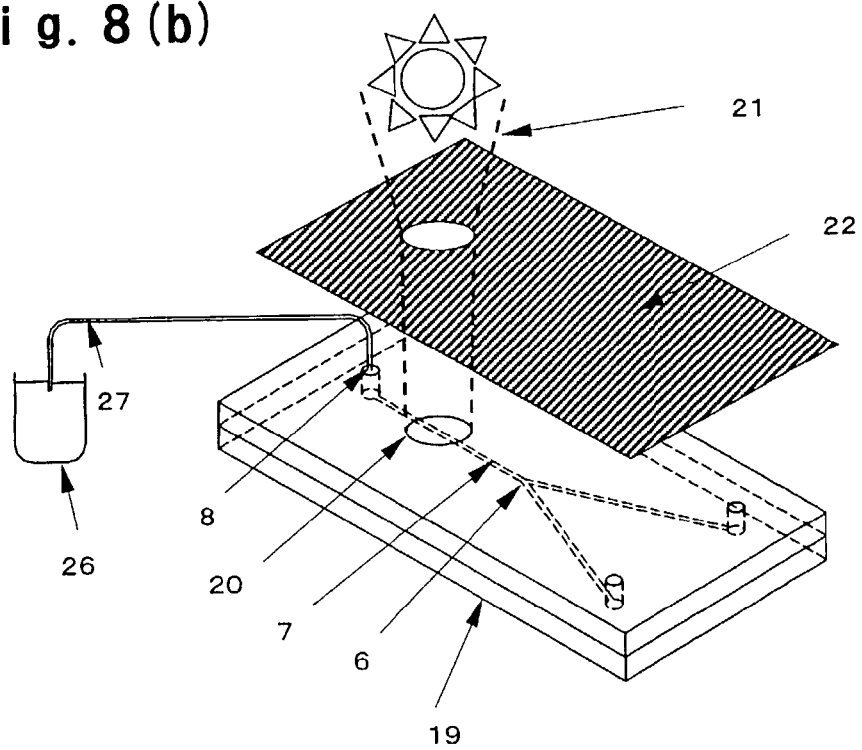
FIG. 8(b) is a schematic diagram showing a method for hardening fine particles by the irradiation of light through a mask.

Another way to harden fine droplets in the present invention is to harden the fine droplets by irradiating light. The light used in this case is preferably ultraviolet rays because a material for the fine droplets to be hardened can be selected from more kinds of material. As shown in FIG. 8(a), light irradiation 21 may be conducted in the outside of the fine channel device after fine droplets is discharged through the outlet port 8 of the fine channel device 19. However, it is preferable for the purpose of making the particle size of fine particles more uniform that light irradiation 21 is conducted immediately after the fine droplets have been produced at the confluent portion 6 of the fine channel so that they are hardened in the outlet channel 7 of the fine channel device 19, as shown in FIG. 8(b). In this case, however, when light irradiation is conducted at the outlet channel of the fine channel device, a mask 22 should be provided so that a light irradiation spot 20 is given to a necessary portion in the fine channel device, i.e., a portion of the outlet channel where the fine droplets are hardened by the irradiation of light as shown in FIG. 8(b), excluding a portion of the outlet channel where the fine droplets are not yet produced. In FIGS. 8(a) and 8(b), numeral 26 designates a beaker and numeral 27 designates a Teflon tube.

Figure 9A:
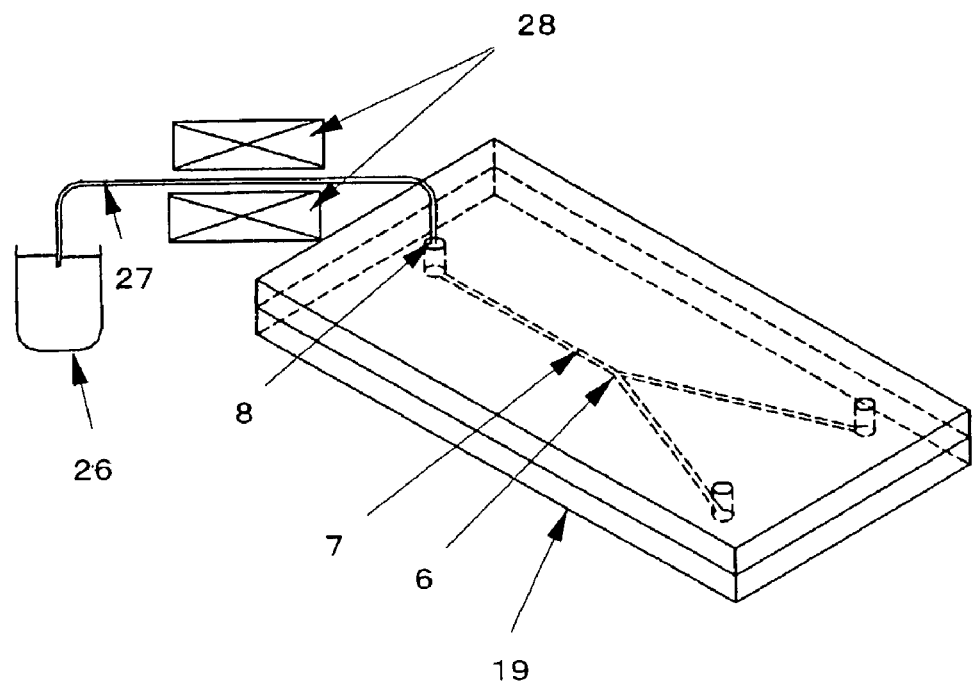
FIG. 9(a) is a schematic diagram showing a method for hardening fine particles by heat from a heating means disposed outside.
Figure 9B:
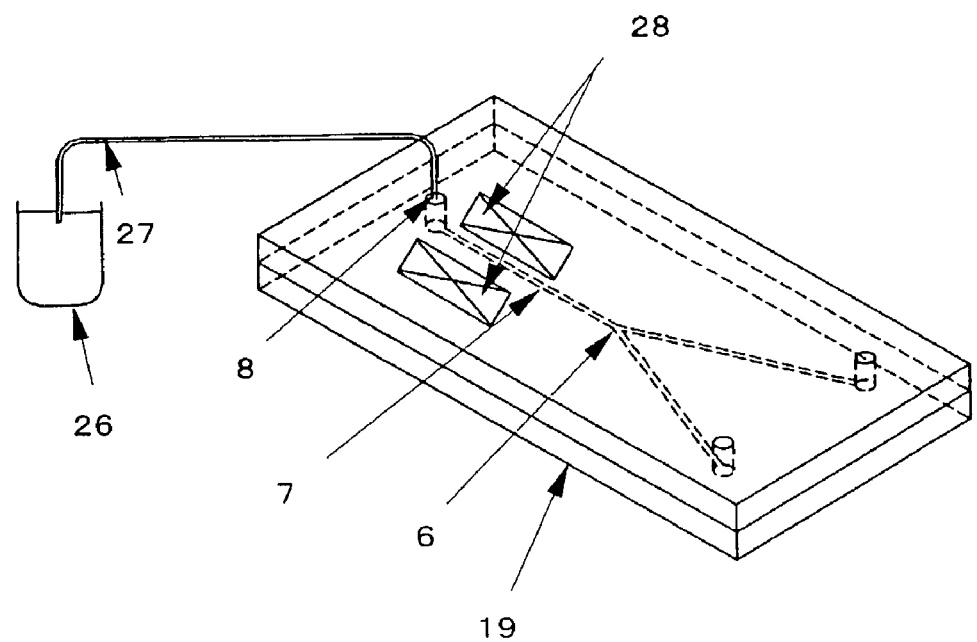
FIG. 9(b) is a schematic diagram showing a method for hardening fine particles by the heating means disposed inside the fine channel device.

Further, according to the present invention, there is another fine particle producing method in which fine droplets are hardened by heat from a hardening means. As shown in FIG. 9(a), a heater 28 is disposed at the outside of the fine channel device 19 to heat fine droplets after they have been discharged from the outlet port 8 of the device. However, it is more preferable for the purpose of making the particle size of the fine particles more uniform that the fine droplets are heated by a heater 28 to harden them in the outlet channel 7 of the fine channel device 19 immediately after the fine droplets have been produced at the confluent portion 6 of the fine channel, as shown in FIG. 9(b). In the later case that heating is conducted at the outlet channel in the fine channel device, however, a thermal insulation means, which may be a known thermal insulation technique such as embedding an insulation material in the fine channel device, should be provided to separate a portion of the outlet channel where the fine droplets are not yet produced and the hardening of the dispersion phase should not be caused before the fine droplets are produced, from a portion of the outlet channel where the fine droplets are hardened by heat.

When the fine droplets are to be hardened by irradiating light or heating in the present invention, the entirety of each fine droplets may be hardened or the fine droplets may be hardened partially to such extent that the shape of the fine droplets is not deformed or the fine droplets do not agglomerate. In this case, the fine particles having uniform particle size can be obtained by recovering partially hardened fine particles in a beaker 26 or the like and hardening them completely by conducting again the irradiation of light or heating.

Thus, by collecting fine droplets as fine particles produced at the confluent portion of the fine channel in a beaker at the outside of the fine channel and hardening the fine droplets by cross-linking polymerization or the like, the disadvantage of an increase of fluctuation of particle size of hardened fine particles because the shape of the fine particles is deformed in a time from the collection of the fine droplets to the hardening, or the fine particles agglomerate each other, can be eliminated, and fine particles having uniform particle size can be obtained. Further, it can be easy to separate the fine droplets from a medium by hardening them.

As described above, as one of most preferable embodiments of the fine particle producing method of the present invention, there is a fine particle producing method for producing fine particles by using a fine channel device provided with an inlet port and an inlet channel which feed a dispersion phase as a medium containing a gel-producing material, an inlet port and an inlet channel which feed a continuous phase as a medium containing a gel-producing dispersant, and an outlet channel and an outlet port which discharge fine particles produced by the dispersion phase and the continuous phase, characterized in that the dispersion phase is transformed into fine particles by being joined with the continuous phase, the particle size of the fine particles is controlled by changing the angle of the confluent portion at which the inlet channel for feeding the dispersion phase is joined with the inlet channel for feeding the continuous phase, and the fine particles are hardened in the fine channel and/or out the fine channel by the irradiation of light and/or heating.

In the fine particle producing method of the present invention, the fine particles are used for microcapsules for pressure-measuring films, non-carbon (pressure sensitive) papers, toner, adhesives for seal-lock agents, insulation particles of metal, thermal expansion materials, heating media, photochromic glass, thermochromic materials (temperature-sensitive liquid crystal, temperature-sensitive dye), magnetophoretic capsules, agrichemicals, synthetic diet, artificial seeds, aromatic substance, cold cream, lipsticks, capsules for vitamins, activated carbon, capsulated enzyme, DDS (drug delivery system) or gel of a packing material for a high-speed liquid chromatography column, gap adjusting materials (spacers) or the like.

(Fine Channel Device)

According to the present invention, there is provided a fine channel device comprising a fine channel provided with an inlet port and an inlet channel which feed a dispersion phase, an inlet port and an inlet channel which feed a continuous phase, and an outlet channel and an outlet port which discharge fine particles produced by the dispersion phase and the continuous phase, characterized in that the inlet channel for feeding the dispersion phase and the inlet channel for feeding the continuous phase are joined at an arbitrary angle, and said two inlet channels are connected to the outlet channel at the arbitrary angle. Fine channel devices as shown in FIGS. 3 to 7 can be considered as specific embodiments. However, the fine channel device of the present invention is not limited to such embodiments as in FIGS. 3 to 7, but can be modified optionally as far as the spirit of the present invention can be realized. Further, the fine channel device of the present invention is characterized in that the aspect ratio in cross section of the fine channel (the ratio of depth/width of the channel) is from 0.30 to less than 3.0.

Here, the inlet port for feeding the dispersion phase means an opening portion for introducing the dispersion phase, and the inlet port may be provided with an appropriate attachment to feed the dispersion phase continuously. Similarly, the inlet port for feeding the continuous phase means an opening portion for introducing the continuous phase, and the inlet port may be provided with an appropriate attachment to feed the continuous phase continuously.

The inlet channel for feeding the dispersion phase is communicated with the inlet port so that the dispersion phase is fed along the inlet channel. The shape of the inlet channel, which influences in controlling the shape and particle size of fine particles, should have a width of about 300 µm or less, and should be in a suitable form to join to an outlet channel at an arbitrary angle. Similarly, the inlet channel for feeding the continuous phase is communicated with the inlet port so that the continuous phase is fed along the inlet channel. The shape of the inlet channel, which influences in controlling the shape and particle size of fine particles, should have a width of about 300 µm or less, and should be in a suitable form to join to the outlet channel at an arbitrary angle.

The outlet channel is communicated with the above-mentioned two inlet channels and an outlet port. After the dispersion phase and the continuous phase have joined, they are fed along the outlet channel to be discharged from the outlet port. The shape of the outlet channel, which is not in particular limited, should have a width of about 300 µm or less, and should be in a suitable form to join to the inlet channels at an arbitrary angle. Further, the outlet channel may be constituted by two or more outlet channels branched at the confluent portion. The outlet port means an opening portion for discharging produced fine particles. The outlet port may be provided with an appropriate attachment so that a phase containing produced fine particles is discharged continuously. In this specification, these channels may be referred to as a fine channel as a whole.

In the fine channel device of the present invention, it is preferable that the inlet channel for feeding the dispersion phase and the inlet channel for feeding the continuous phase are joined at an arbitrary angle, and said two inlet channels are connected to the outlet channel at the arbitrary angle. By determining the angle of the confluent portion at which the two inlet channels join, it is possible to control fine particles produced at the confluent portion to have a predetermined particle size. The angle at the confluent portion can be determined appropriately depending on an intended particle size.

With respect to shapes in cross section of the inlet channel and the outlet channel, it is preferable that the aspect ratio in cross section of either channel is in a range of from 0.30 to less than 3.0. By keeping the aspect ratio of such range, uniform fine particles can be produced at the confluent portion. If the aspect ratio is less than 0.3 or not less than 3.0, it may be difficult to produce uniform fine particles.

Further, when the width and the depth of the inlet channel for feeding the dispersion phase and the inlet channel for feeding the continuous phase are equal respectively, designing of the fine channel device becomes easy and the control of fluid supply becomes also easy in addition to the above-mentioned advantage. Therefore, the fine channel device is suitable for industrial mass production.

Further, in the relation between the width of the inlet channel and the width of the outlet channel, the width of the inlet channel should not be smaller than the width of the outlet channel. In this case, it is possible to produce uniform fine particles at the confluent portion even though the fuel supply rate is increased in comparison with a relation that the width of the inlet channel<the width of the outlet channel. Thus the rate of producing fine particles can be increased.

With respect to the width of the outlet channel, it is preferable that the width of the outlet channel is narrowed at a portion in the outlet channel portion from the point at which the dispersion phase and the continuous phase join, to the outlet port. Specifically, in a path before reaching the outlet port for fine particles, a narrowed portion is formed at the confluent portion at which the inlet channel and the outlet channel join; a convex portion is formed in a wall constituting the path for the dispersion phase, or at least one projection is formed in at least one surface among a bottom surface, an upper surface and side surfaces as shown in FIGS. 32(b) to 32(i). Accordingly, it is possible to produce uniform fine particles at the confluent portion even when the rate of fluid supply is increased, and it is possible to suppress an increase of fuel supply pressure.

Further, it is preferable that the portion where the width of the outlet channel is narrowed is formed at the confluent portion in the discharge channel or in the vicinity thereof. In particular, it is preferable that the portion where the width of the outlet channel is narrowed is at a side of inlet channel for feeding the dispersion phase with respect to the confluent portion of the outlet channel.

Further, in the fine channel device of the present invention, a plurality of fine channels are arranged in a two-dimensionally or a three-dimensionally in the device whereby fine particles can be produced in an industrial scale. However, there is requirement that fluid be distributed uniformly in the plurality of fine channels arranged two-dimensionally or three-dimensionally. Accordingly, it is preferable that the fine channel device comprises an inlet port for feeding fluid, an outlet port for discharging the fluid, a common channel formed in a substrate to communicate the inlet port with the outlet port, and at least one fine channel communicated with the common channel at positions different from the inlet port and the outlet port, characterized in that the cross-sectional area of the common channel is increased gradually from the portion where the inlet port is communicated with the common channel to the portion where the outlet port is communicated with the common channel, or unchanged.

Figure 10:
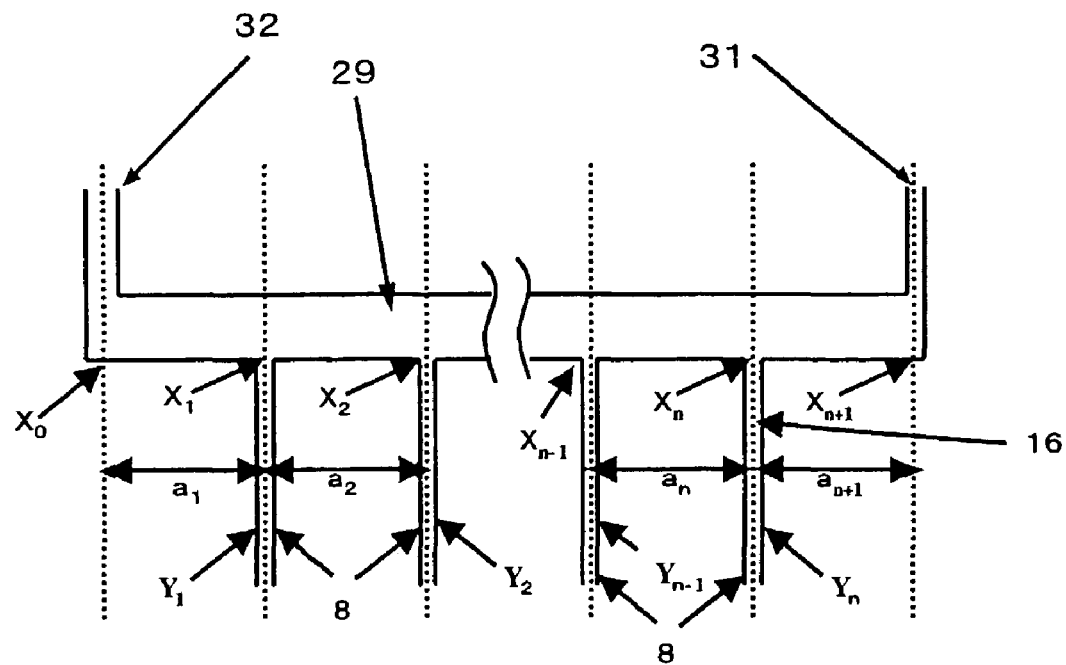
FIG. 10 is a conceptual diagram showing the most basic arrangement of fine channels for feeding fluid uniformly to a plurality of fine channels arranged in a two-dimensional form or a three-dimensional form.

FIG. 10 shows the most basic conceptual diagram of the fine channel device of the present invention. A common channel inlet port 32 for feeding fluid and a common channel outlet port 31 for discharging fluid are formed at both ends of a common channel 29, and fine channels 16 having smaller inner diameter (channel width) than the common channel are provided between the common channel inlet port 32 and the common channel outlet port 31. The fine channels 16 are formed in a substrate. The inner diameter of each fine channel is generally about several tens to about 300 μm. On the other hand, it is desirable that the inner diameter of each common channel is from about 500 μm to several mm. Although there is in particular no limitation about the inner diameter of a channel connecting the common channel inlet port to the common channel, it is desirable that the inner diameter is from about 500 μm to several mm in the same manner as the common channel. Although there is in particular no limitation about the inner diameter of a channel connecting the common channel outlet port to the common channel, it is desirable that it is from several tens to about 300 μm in the same manner as the fine channel.

Further, the arrangement of the fine channels is not in particular limited as far as they are communicated with the common channel at positions different from those of the common channel inlet port and the common channel outlet port. More specifically, it is preferable that the fine channel device is constructed in such a manner that an n number of fine channels including a fine channel $Y_1$ formed at the position closest to the common channel inlet port and a fine channel $Y_n$ formed at the position closest to the common channel outlet port are communicated with the common channel, wherein when the position of communication to the common channel inlet port is indicated by $X_0$, the position of communication of the fine channel $Y_1$ closest to the common channel inlet port is indicated by $X_1$, the length between $X_0$ and $X_1$ along the common channel is indicated by $a_1$, the position of communication to the common channel outlet port is indicated by $X_{n+1}$, the position of communication of the fine channel $Y_n$ closest to the common channel outlet port is indicated by $X_n$, and the length between $X_n$ and $X_{n+1}$ along the common channel is indicated by $a_{n+1}$, distances of $a_2$ to $a_n$ are all equal, as shown in FIG. 10, whereby fluid can be distributed uniformly to fine channels $Y_1$ to $Y_n$, and fine droplets can be produced effectively. In addition, such effect can further be improved by making distances of $a_1$ to $a_{n+1}$ equal.

Further, the fine channel device may have such a structure that a plurality of common channels are formed in a substrate, and each common channel is communicated with fine channels.

FIGS. 11 to 14 are conceptual diagrams showing some embodiments of the present invention. However, the present invention is not limited to such embodiments but modification can be made optionally as far as the spirit of the present invention can be maintained.

Figure 11:
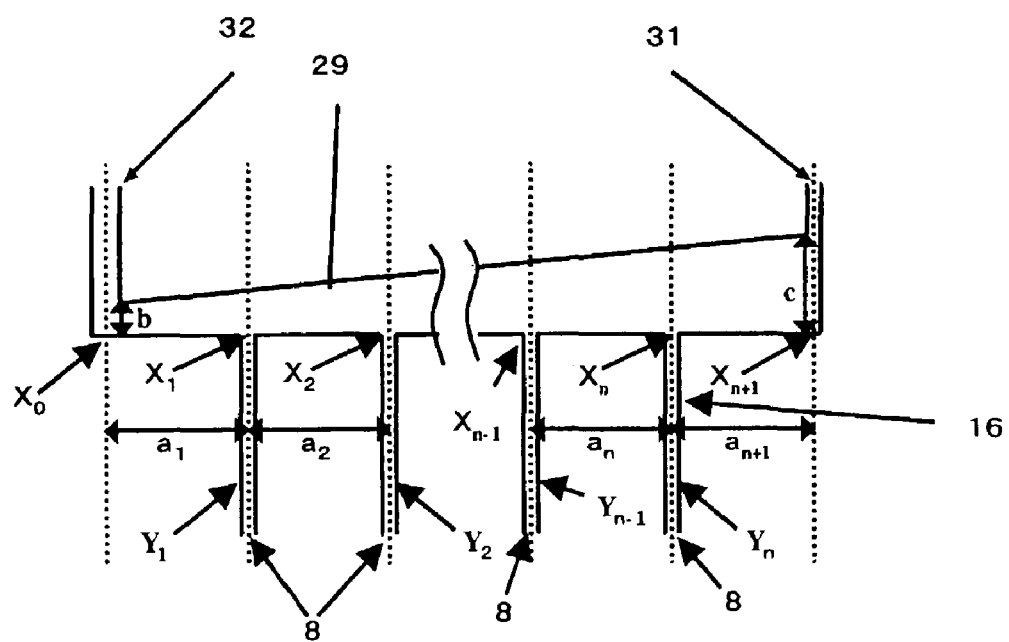
FIG. 11 is a conceptual diagram showing an example of the arrangement of fine channels for feeding fluid uniformly to a plurality of fine channels arranged in a two-dimensional form or a three-dimensional form wherein the cross-sectional area of a common channel is gradually increased from an inlet port for the common channel to an outlet port for the common channel.

FIG. 11 is a conceptual diagram showing an embodiment wherein the inner diameter of the common channel is increased gradually from a common channel inlet port 32 to a common channel outlet port 31. In this case, the inner diameter (indicated by a letter b) of the common channel at a position near the common channel inlet port 32 is about 500 μm to 1 mm, and the inner diameter (indicated by a letter c) of the common channel at a position near the common channel outlet port 31 is about several mm.

Figure 12:
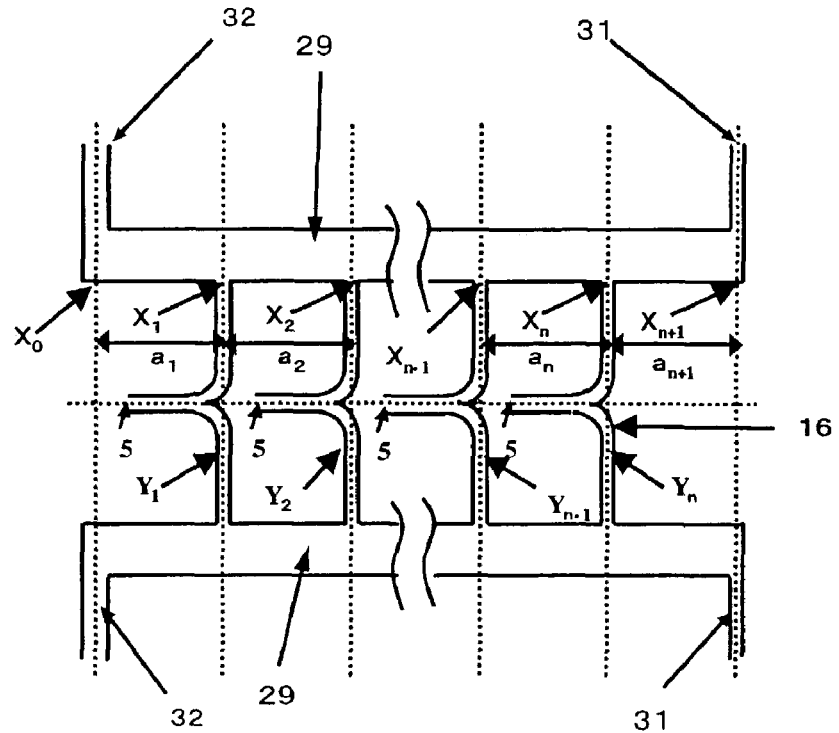
FIG. 12 is a conceptual diagram showing an example of the arrangement of fine channels for feeding fluid uniformly to a plurality of fine channels arranged in a two-dimensional form or a three-dimensional form wherein fluid is supplied from two common channels to a plurality of Y-letter like fine channels.

FIG. 12 shows an embodiment wherein fine channels 16 indicated by $Y_1$ to $Y_n$ are drawn from two common channels 29 respectively, and each of paired fine channels $Y_1$ to $Y_n$ has a confluent portion at a Y-letter like portion. By using the fine channel device shown in FIG. 12 and by introducing into the two common channels 29 respectively the continuous phase and the dispersion phase used in the fine particle producing method of the present invention, the continuous phase and the dispersion phase can be distributed uniformly to the Y-letter like fine channels whereby fine droplets having very uniform size can be produced in these fine channels under the same condition. This embodiment is effective when the fine channel substrate is a rectangular substrate and a large number of fine channels are formed two-dimensionally.

Figure 13:
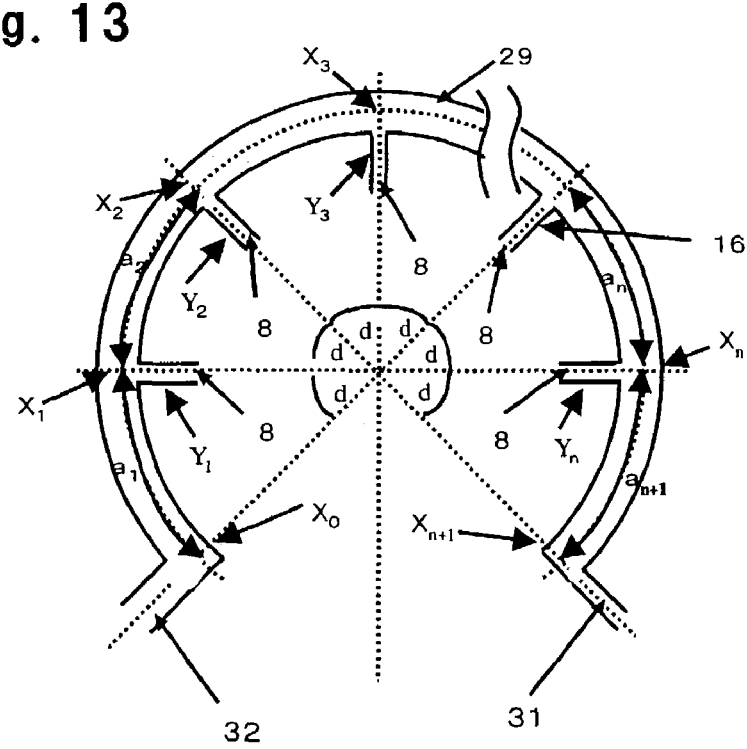
FIG. 13 is a conceptual diagram showing an example of the arrangement of fine channels for feeding fluid uniformly to a plurality of fine channels arranged in a two-dimensional form or a three-dimensional form wherein a common channel is formed to have a circular arc form.

FIG. 13 shows another embodiment wherein a common channel 29 is extended in a circular arc form. Fine channels 16 are arranged in a radial direction from the center of the arc at the same angle d. This embodiment is effective when the fine channel substrate is a circular disk like substrate and a large number of fine channels are formed two-dimensionally. In this case, when the position of communication to the inlet port 32 is indicated by $X_0$, the position of communication of the fine channel $Y_1$ closest to the common channel inlet port 32 is indicated by $X_1$, the length between the position of the communication $X_0$ and the position of communication $X_1$ along the common channel is indicated by $a_1$ etc., $a_1$ to $a_{n+1}$ indicate lengths along the center of the circular-arc common channel.

FIG. 14 shows an embodiment wherein fine channel substrates 1 each having a fine channel are piled up, and common channels are formed so as to penetrate the fine channel substrates. This embodiment is effective when a large number of fine channels are formed in a three-dimensional manner by laminating the fine channel substrates. The inner diameter of the common channels may be enlarged gradually from the common channel inlet ports 32 to the common channel outlet port 31 in the same manner as that shown in FIG. 11. Reference numeral 30 designates a cover member.

In the embodiments of the present invention shown in FIGS. 10 to 14, fluid is generally introduced to a common channel inlet port 32 by means of a fluid supply pump such as a syringe pump. In this case, fluid discharged through a common channel outlet port 31 may be recovered and returned to the fuel supply pump in order to conduct again fuel supply. Namely, it may be so constructed that a common channel is communicated with fine channels and fluid discharged through a common channel outlet port is returned to the common channel through a common channel inlet port. Thus, the continuous phase and/or the dispersion phase to be introduced can be used effectively. Further, it is preferable that the dispersion phase is fed to at least one common channel and the continuous phase is fed to at least another common channel so that produced fine particles are discharged.

Other than the fine channel devices having structures and performance as described above, the fine channel device of the present invention may be a fine channel device provided with inlet ports and inlet channels for feeding a dispersion phase and a continuous phase, a confluent portion at which the inlet channels join, and an outlet channel and an outlet port for discharging fluid wherein a substrate having at least one surface in which a fine channel is formed and a cover member having an orifice formed at a predetermined position corresponding to the fine channel, which communicates the fine channel to the outside of the fine channel device, the cover member being laminated integrally with the substrate so as to cover the surface having the fine channel of the substrate. The fine channel device having the above-mentioned structure allows to supply fluid from the outside of the device to the fine channel and can discharge the fluid to the outside. The fluid can stably be passed through the fine channel even when the amount of the fluid to be supplied is small. The fluid supply can be done by a mechanical means such as a micropump.

As materials for the substrate having a fine channel and the cover member, it is desirable to use a material enabling easy formation of the fine channel and having excellent chemical resistance and a proper rigidity. For example, glass, quarts, ceramics, silicone, metal or resin may be used. Sizes and shapes of the substrate and the cover member are not in particular limited. However, it is desirable that the thickness is several mm or less. The diameter of the orifice formed in the cover member is desirably several mm or less when it communicates the fine channel with the outside of the fine channel device and it is used as an inlet port or outlet port for fluid. The orifice of the cover member can be formed chemically, mechanically or using any means such as laser irradiation, ion etching or the like.

In the fine channel device of the present invention, the substrate having a fine channel and the cover member can be laminated in one piece by means of thermal bonding or adhesion bonding using an adhesive such as a photo-setting resin or a heat-setting resin.

(Solvent Extraction Method Using Fine Channel Device)

The fine channel device of the present invention is applicable to a solvent extraction method wherein fine droplets are formed from an extracting solvent or fluid containing a material to be extracted, in the fine channel, and solvent extraction is caused by phase transfer of the material to be extracted between the dispersed phase composed of the droplets and the continuous phase surrounding the fine droplets.

In the solvent extraction method of the present invention, either one of an extracting solvent and fluid containing a material to be extracted can be selected optionally as a dispersion phase or the other can be a continuous phase. Here, the material to be extracted is a material as an object of extraction, and the fluid containing a material to be extracted means liquid in which the material to be extracted is dissolved. The extracting solvent means liquid for extracting the material to be extracted from the fluid containing a material to be extracted. The extracting solvent should be capable of dissolving the material to be extracted and has a higher solubility to the material to be extracted than the fluid containing the material to be extracted. Further, the solvent extraction means transferring the material to be extracted from the fluid containing a material to be extracted into an extracting solvent by phase transfer, and the phase transfer means the transfer from a phase of fluid containing a material to be extracted to a phase of extracting solvent.

In the present invention, either the extracting solvent or the fluid containing a material to be extracted can be chosen optionally as a dispersion phase and the other can be a continuous phase. Further, the size (diameter) of the fine droplets is generally smaller than the width or the depth of the fine channel. For example, the size of the droplets produced in a fine channel having a width of 100 μm and a depth of 50 μm is smaller than 50 μm in diameter when each fine droplet has a complete spherical body.

The solvent extraction method of the present invention provides the shortening of a diffusion time and enlarges specific interfacial area at the fluid boundary much more than those determined by the width of the fine channel. Accordingly, the efficiency of extraction in the fine channel can be improved much more than the efficiency determined by the width of the fine channel. This will be described with reference to FIG. 15.

Figure 2A:
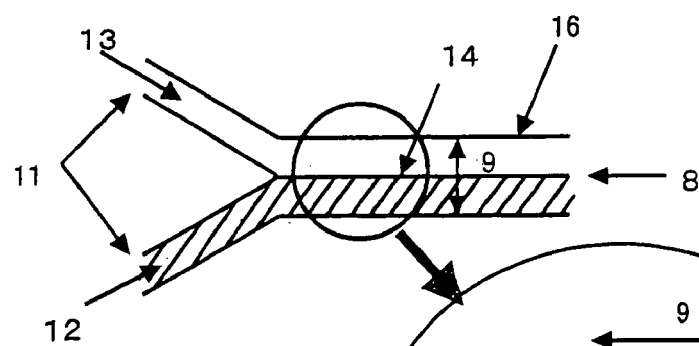
FIG. 2(a) is a conceptual diagram showing a laminar flow in a Y-letter like fine channel.
Figure 2B:
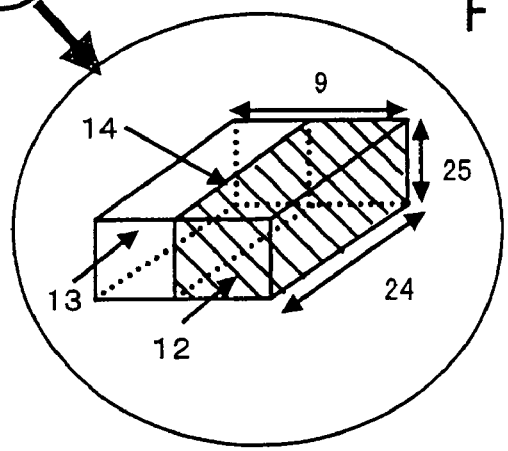
FIG. 2(b) is a stereoscopical cross-sectional view of a portion surrounded by a circle in FIG. 2(a) in an enlarged scale.
Figure 15:
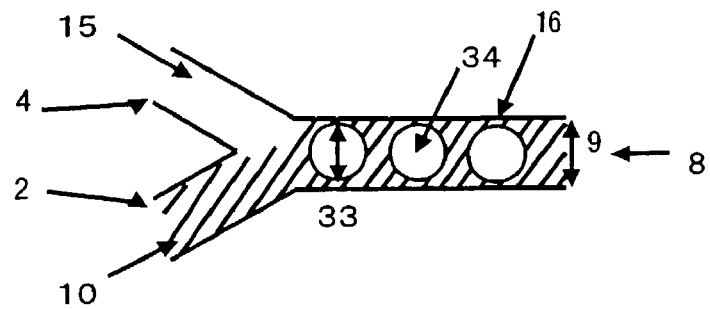
FIG. 15 is a conceptual diagram showing fine particles produced in a fine channel.

In FIG. 15, when the diameter 33 of a spherical fine droplet 34 is represented by D (μm), the total volume of the fine droplet is $(4\pi/3) \times (D/2)^3$ (μm$^3$). Further the surface area of the fine droplet is $4\pi \times (D/2)^2$ (μm$^2$). Accordingly, the specific interfacial area of the fine droplet 34 to the surrounding medium is $\{4\pi \times (D/2)^2\}/\{(4\pi/3) \times (D/2)^3\} = 6 \times 10^4/D$ (cm$^{-1}$). On the other hand, the specific interfacial area of the fine droplet 16 at the fluid boundary 14 is $2 \times 10^4/W$ (cm$^{-1}$), as shown in FIG. 2. Generally, since the diameter D of a fine droplet formed in the fine channel is smaller than the width 9 (W) of the fine channel, i.e., D<W, the specific interfacial area of the fine droplet formed in the fine channel is larger than the specific interfacial area of the fluid boundary formed in the fine channel, and the diffusion time of the fine droplet made of the surrounding solvent becomes shorter than the diffusion time when a laminar flow is simply produced in the fine channel. Accordingly, when a fine droplet of extracting solvent or fluid containing a material to be extracted is formed in the fine channel, the shortening of the diffusion time and a large specific interfacial area of the fluid boundary can be obtained with efficiency much more than those expected by the width of the fine channel, and the efficiency of extraction in the fine channel can be improved much more than the efficiency determined by the width of the fine channel.

The object material to form a fine droplet may be an extracting solvent or fluid containing a material to be extracted. In the selection of a material for forming fine droplets, it can be selected in consideration that an extracted phase can easily be separated after the extraction has been conducted to form fine droplets by using selectively either one. In the fine particle producing method of the present invention, the selection of either the extracting solvent or the fluid containing a material to be extracted can be carried out by controlling properly flow rates of the two kinds of fluid to be joined, or changing the hydrophilicity or non-hydrophilicity of an inner wall of the fine channel according to a known method. Thus, the selection of the object to form fine droplets can be made in consideration that the extracted phase can be easily separated after the extraction. The diameter of fine droplets can be controlled by adjusting the flow rates, the angle of the confluent portion of the fine channel, the width and depth of the fine channel or by combining these, and the specific interfacial area can be controlled more precisely.

In the solvent extraction method of the present invention, the material to be extracted is a product obtained by the chemical reaction of at least two kinds of fluid, and the fluid containing a material to be extracted may be fluid obtained by introducing at least two kinds of fluid containing a raw material separately and making the two kinds of fluid contact mutually. Thus, the product formed by the reaction in the fine channel can be solvent-extracted immediately after the production, and it is possible to suppress a side reaction or to control a balanced reaction.

Figure 16:
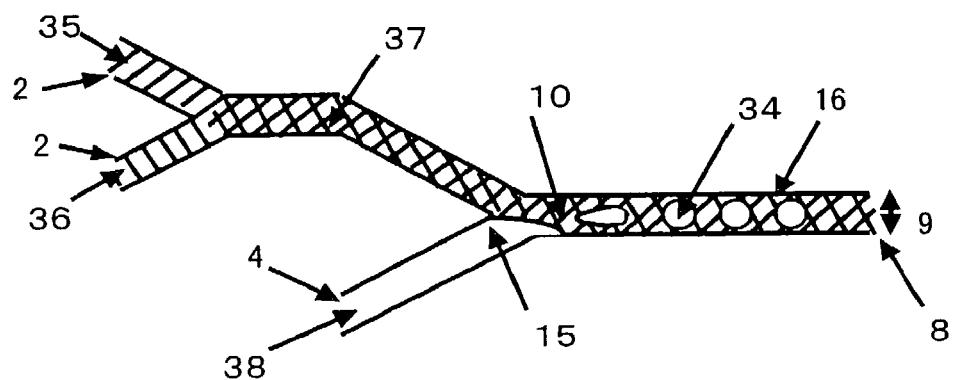
FIG. 16 is a conceptual diagram showing a solvent extraction method as an application of fine particles of the present invention wherein fluid containing a material to be extracted is fluid obtained by feeding two kinds of fluid containing raw materials separately to channels, mixing and reacting in a reaction phase in a channel.

FIG. 16 is a conceptual diagram in a case that the fluid containing a material to be extracted is fluid obtained by introducing fluid A (35) and fluid B (36) containing a raw material separately into a fine channel 16 to mix and react them in a reaction area 37 in the fine channel. In the case shown in FIG. 16, the fluid containing a material to be extracted is used as a continuous phase 10 and an extracting solvent 38 is as a dispersion phase 15.

The solvent extraction method of the present invention may be a method for feeding at least two kinds of fluid containing a raw material and an extracting solvent separately into a fine channel, and extracting an extracted material which is obtained by contacting the at least two kinds of fluid having a raw material, into an extracting solvent phase, wherein the at least two kinds of fluid containing a raw material form a laminar flow to produce the extracted material at the fluid boundary, and the extracting solvent is chopped at the confluent portion by the two kinds of fluid containing a raw material to thereby form droplets at the fluid boundary, whereby the extracted material produced is extracted as droplets of extracting solvent. Thus, any kind of solvent other than the solvent used for the reaction can be used as the extracting solvent. For example, a solvent having a high efficiency to extract a product can be used as the extracting solvent. Further, since the solvent extraction of the product produced by the reaction at the fluid boundary can be promptly carried out immediately after the production, the suppression of a side reaction or the control of a balanced reaction becomes possible.

Figure 17:
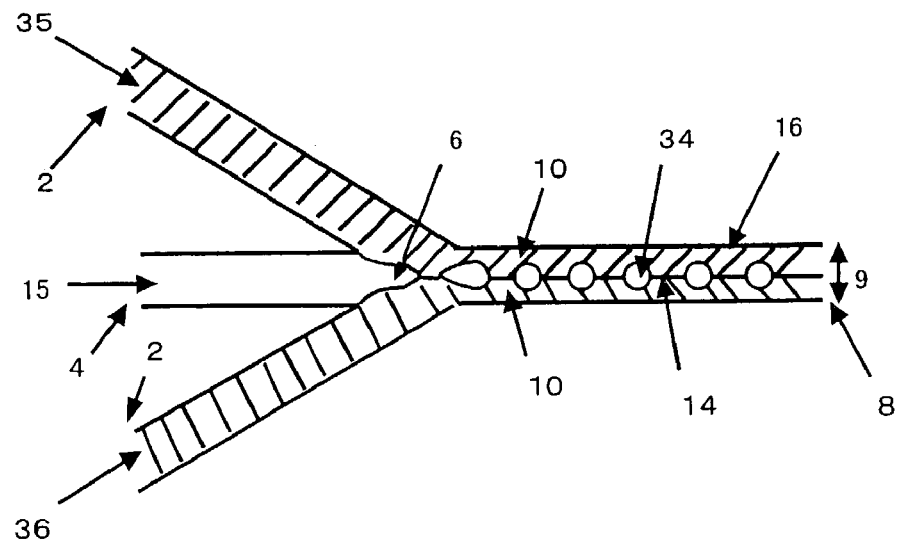
FIG. 17 is a conceptual diagram showing an example of extracting a product in a fine channel for producing the product by a reaction caused in the fluid boundary wherein two kinds of fluid containing raw materials are supplied as continuous phases and a dispersion phase is fed through another channel so that fine droplets are formed at the fluid boundary by chopping the dispersion phase as an extracting solvent by the continuous phases to extract the product produced at the fluid boundary.

FIG. 17 is a conceptual diagram showing the extraction of a product produced at the fluid boundary. A fluid A (35) and a fluid B (36) containing a raw material are introduced as continuous phases 10 into a fine channel 16 to form a fluid boundary 14 formed at the confluent portion. On the other hand, an extracting solvent 38 as a dispersion phase 15 is introduced from an inlet port 4 into the fine channel 16. Then, the extracting solvent 38 is chopped by the continuous phases at the confluent portion so that fine droplets 34 are formed at the fluid boundary. Thus the fine droplets as a product produced at the fluid boundary can be extracted.

Further, in the solvent extraction method as an application of the fine channel of the present invention, the continuous phase and the dispersion phase can be separated by hardening at least a surface portion of the fine droplets after conducting the solvent extraction in the fine channel. By the hardening, fine droplets as the dispersed phase can easily be separated from the continuous phase surrounding the fine droplets, and the extracting solvent can easily be separated from the fluid containing a material to be extracted.

Figure 18:
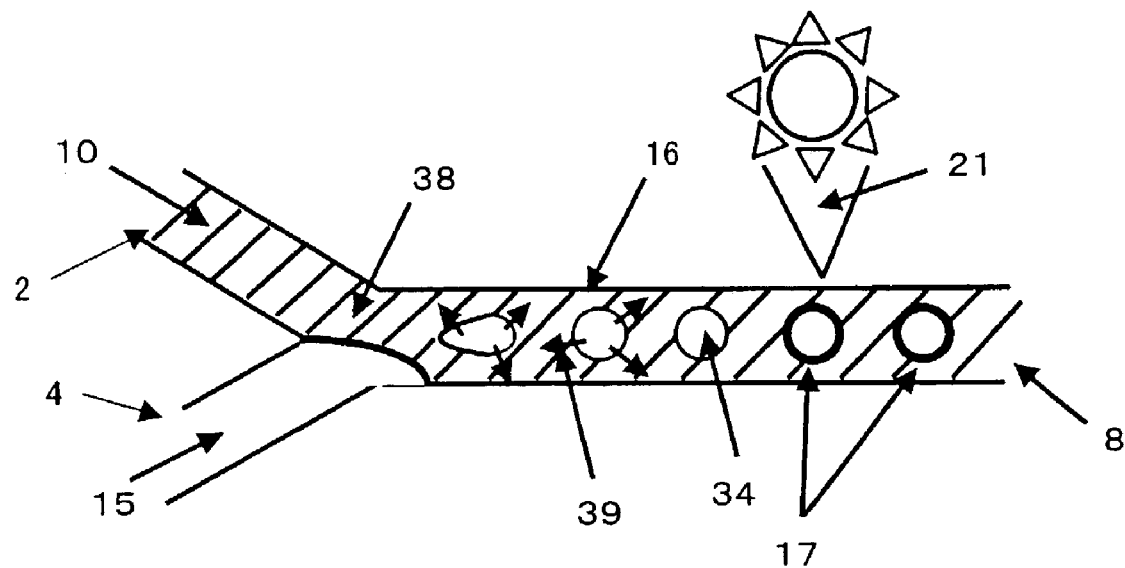
FIG. 18 is a conceptual diagram showing an example of separating an extracted material wherein fluid containing a material to be extracted is transformed into fine droplets as a dispersed phase, and an extracting solvent as a continuous phase is supplied so that solvent extraction is conducted by the phase transfer, and at least the front surface of each fine droplets is hardened to separate the material to be extracted.

For example, a technique as shown in FIG. 18 can be used to separate and recover a material to be extracted easily. In FIG. 18, fluid containing a material to be extracted is used as a dispersion phase 15, and an extracting solvent 38 is used as a continuous phase 10. The material to be extracted is transformed into fine droplets, and solvent extraction 39 is conducted by the phase transfer of the material. Then, ultraviolet rays 21 are irradiated to the fine droplets to harden at least their outer surface to thereby form fine particles 17. Thereafter, a solid phase as the fine particles 17 is separated and recovered easily from a liquid phase as the continuous phase by a technique such as filtration or the like. In this case shown in FIG. 18, for the fluid containing a material to be extracted, as the dispersion phase, liquid capable of being hardened by ultraviolet irradiation is chosen.

Figure 19:
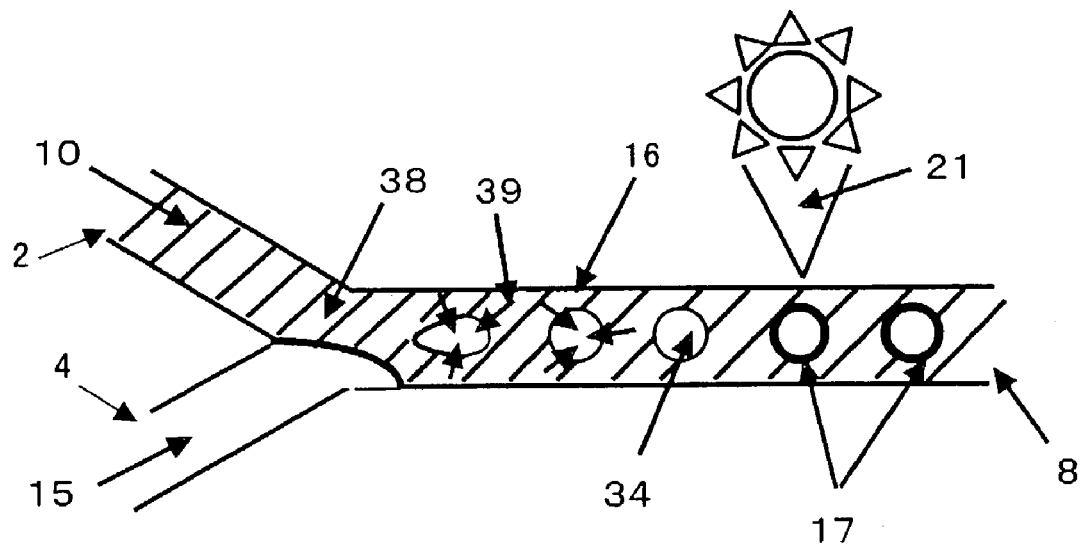
FIG. 19 is a conceptual diagram showing an example of separating a material to be extracted wherein fluid containing a material to be extracted is supplied as a continuous phase, and an extracting solvent as a dispersed phase in a form of fine droplets is supplied so that solvent extraction is conducted by the phase transfer, and at least the surface of each fine droplets is hardened to separate the material to be extracted.

Further, there is another technique to separate a material to be extracted easily, as shown in FIG. 19. In FIG. 19, fluid containing a material to be extracted is used as a continuous phase 10, and an extracting solvent 38 is used as a dispersion phase 15. The material to be extracted is transformed into fine droplets, and solvent extraction 39 is conducted by the phase transfer of the material to be extracted. Then, ultraviolet rays are irradiated to the fine droplets to harden at least their outer surface to thereby form fine particles 17. Then, a solid phase as the fine particles is separated easily from a liquid phase as the continuous phase by a technique such as filtration or the like, in the same manner as in the technique shown in FIG. 18. In this case, the hardened outer surface of the fine particles, inside of which the material to be extracted is held, is broken by using a chemical or mechanical method to take out the material to be extracted held inside the fine particles. In the case of FIG. 19, for the extracting solvent as the dispersion phase, liquid capable of being hardened by ultraviolet irradiation is chosen.

In the cases shown in FIGS. 18 and 19, ultraviolet irradiation is applied to the fine droplets to harden their outer surface. However, another way such as heating, cross-linking or polymerization as shown in FIG. 9 can be chosen so as to meet the material as the dispersed phase to be hardened, other than the ultraviolet irradiation.

EXAMPLES

Now, the present invention will be described in detail with reference to Examples. However, it should be understood that the present invention is by no means restricted by such specific Examples.

Example 1

Figure 20A:
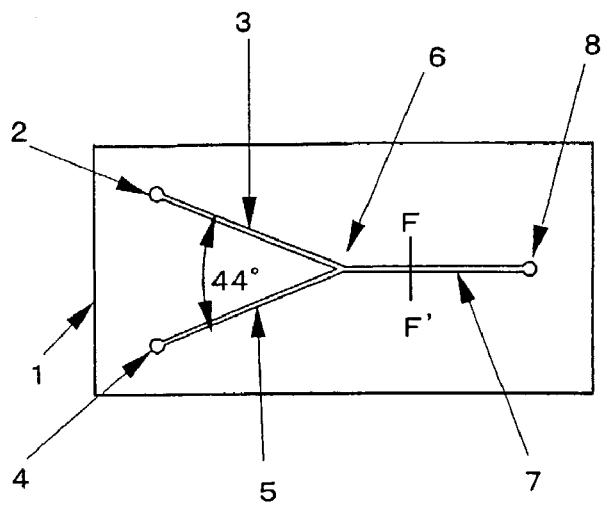
FIG. 20(a) is a schematic diagram showing the fine channel shown in Examples 1, 6 or 8.
Figure 20B:
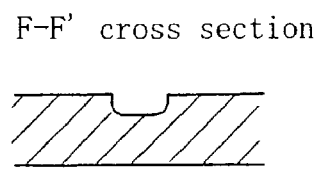
FIG. 20(b) is an enlarged cross-sectional view taken along a line F–F' in FIG. 20(a)
Figure 21:
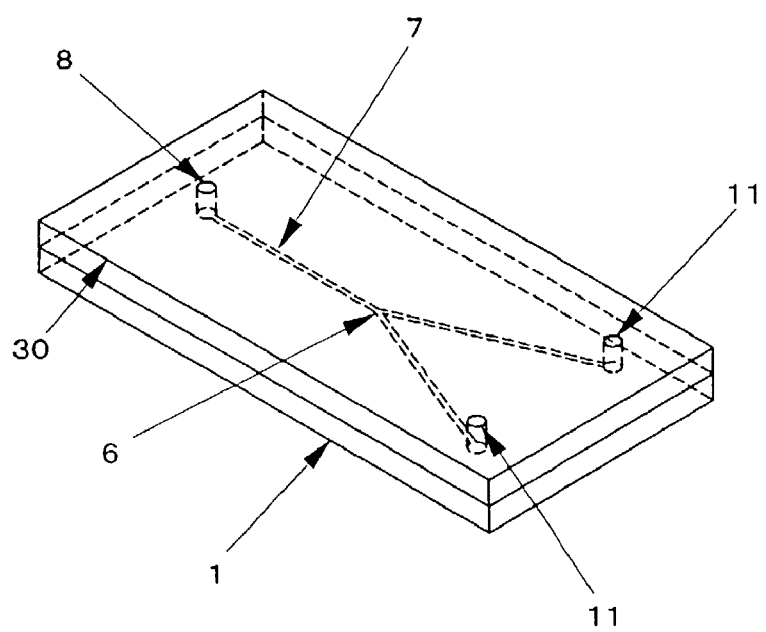
FIG. 21 is a schematic view showing the fine channel device according to Example 1.

FIG. 20 shows a fine channel according to a first Example of the present invention. The fine channel was formed in a Y-letter form in a surface of a Pyrex (trademark) glass of 70 mm×20 mm×1 t (thickness) in which a continuous phase inlet channel 2, a dispersion phase inlet channel 4 and an outlet channel 7, which correspond to the fine channel, had respectively a width of 220 μm, a depth of 80 μm and an aspect ratio of fine channel of 0.36, wherein the length of the outlet channel was 30 mm and the Y-letter like channel had a confluent portion 6 having an angle of 44° which was formed by joining the continuous phase inlet channel 3 and the dispersion phase inlet channel 5. Although the width and the depth of the fine channel depend on the particle size of fine particles to be produced, the aspect ratio of fine channel should not be deviated from a range of from 0.30 to less than 3.0. A fine channel device having such fine channel was prepared, as shown in FIG. 21, by thermally adhering a cover member 30 made of glass of 70 mm×20 mm×1 mm (thickness) on a surface of the Pyrex glass, as a glass substrate 1, of 70 mm×20 mm×1 mm (thickness) wherein the surface of the glass substrate 1 had a fine channel formed by photolithographic and wet etching techniques as conventionally used techniques, and the cover member 30 had orifices having a diameter of 0.6 mm which were previously formed at positions corresponding to inlet ports 11 and an outlet port 8 by mechanical processing. However, it should be noted that the method for the preparation and the material for the substrate and the cover member are not limited to the above-mentioned.

Next, description will be made as to the method for producing fine particles according to the present invention.

Figure 22:
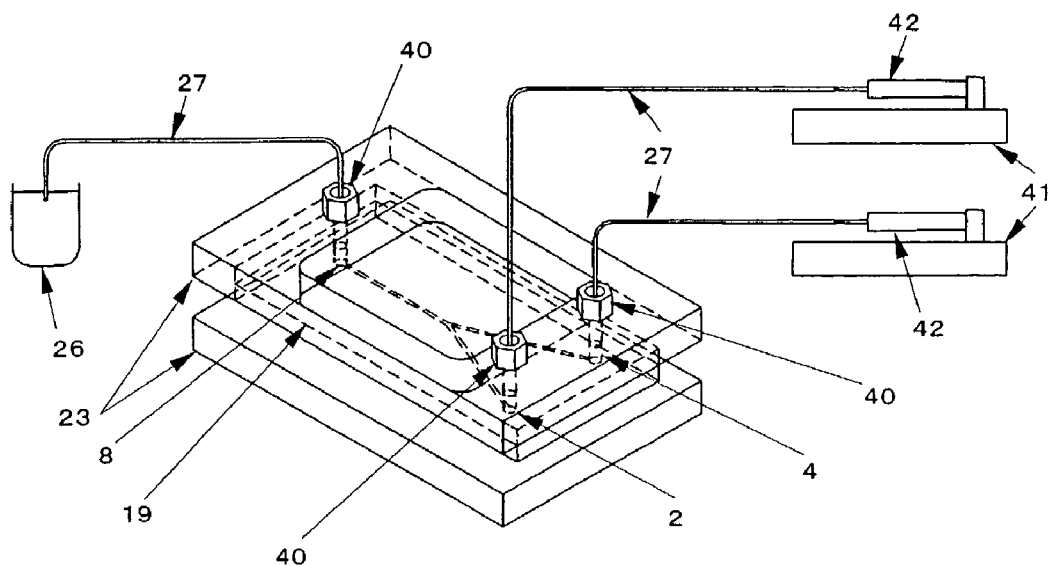
FIG. 22 is a schematic view showing a fine particle producing method in Example 1.

As shown in FIG. 22, a fine channel device 19 is held by holders 23 for facilitating liquid supply. Teflon (trademark) tubes 27 and fillet joints 40 are fixed to a holder wherein an end of a Teflon tube is opened to a beaker 26, and ends of two other Teflon tubes are connected to micro syringes 42. Thus, the supply of liquid to the fine channel device becomes possible.

Figure 23:
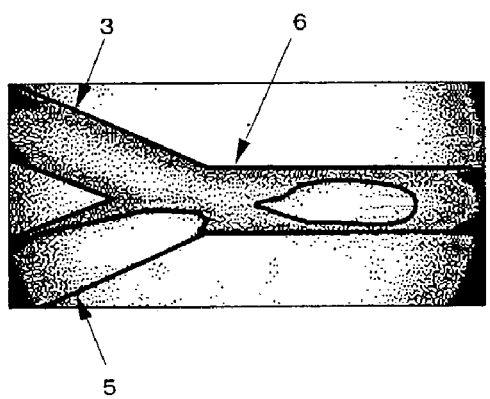
FIG. 23 is a schematic view showing how fine particles shown in Example 1 is produced.

Then, a mixed solution of divinylbenzene and butyl acetate as a dispersion phase for producing fine particles and a 3% aqueous solution of polyvinyl alcohol as a continuous phase were injected into the respective micro syringes 42, and the liquid supply was conducted by micro syringe pumps 41. The rate of liquid supply was 20 μl/min for both the dispersion phase and the continuous phase. Under a condition that the rate of liquid supply was steady for both, the production of fine particles as shown in FIG. 23 was observed at the confluent portion of the fine channel device, at which the dispersion phase and the continuous phase join.

Figure 24:
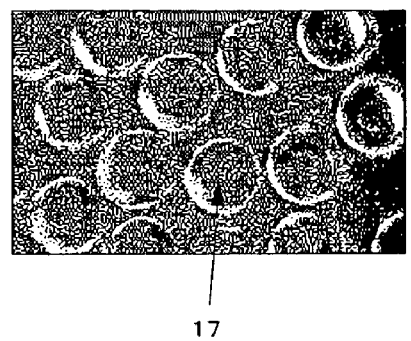
FIG. 24 is a diagram showing fine particles produced in Example 1.

In the observation of the fine particles thus produced, the averaged particle size was 200 μm and the CV value (%) indicating the degree of dispersion of particle size was 9.8% as shown in FIG. 24, which showed extremely uniform fine particles 17. When the dispersion phase and the continuous phase were fed at a rate of liquid supply of 1 μl/min, the averaged particle size of the produced fine particles was 230 μm, and the CV value (%) indicating the degree of dispersion of particle size was 9.5%, which showed extremely uniform fine particles. In this example, since the dispersion phase and the continuous phase are fed at the same rate of liquid supply, it is possible to produce uniform fine particles without the necessity of feeding the continuous phase in an excessive amount.

Example 2

Figure 25A:
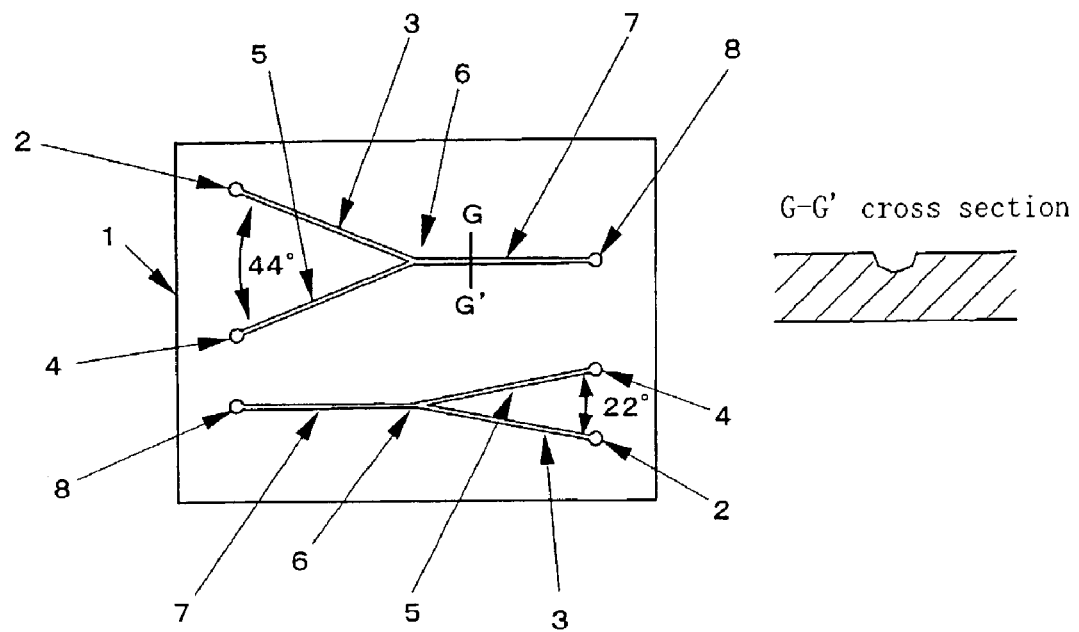
FIG. 25(a) is a schematic view showing fine channels according to Example 2 and FIG. 25(b) is an enlarged cross-sectional view taken along a line G–G' in FIG. 25(a)
Figure 25B:
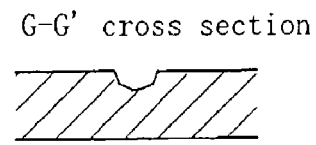

FIG. 25 shows a fine channel according to a second Example of the present invention. The fine channel was comprised of two Y-letter like channels which were formed in a surface of a Pyrex (trademark) glass of 70 mm×40 mm×1 t (thickness) in which continuous phase inlet channels 3, dispersion phase inlet channels 5 and outlet channels 7, which form fine channels, had respectively a width of 185 μm, a depth of 75 μm and an aspect ratio of fine channel of 0.41, wherein the length of the outlet channels 7 was 30 mm and the Y-letter like channels had confluent portions 6 having angles of 22° and 44° which were formed by joining a continuous phase inlet channels 3 and a dispersion phase inlet channel 5. Although the width and the depth of the fine channels depend on the particle size of fine particles to be produced, the aspect ratio of fine channels should not be deviated from a range of from 0.30 to less than 3.0.

A fine channel device having the above-mentioned fine channels was prepared in the same manner as Example 1.

Then, the fine channel device was held by holders; a mixed solution of a monomer (styrene), divinylbenzene, butyl acetate and benzoyl peroxide, as a dispersion phase to produce fine particles, and a 3% aqueous solution of polyvinyl alcohol as a continuous phase were injected into micro syringes, and liquid supply was conducted by micropumps, in the same manner as Example 1, to compare results in the cases of angles of 44° and 22° at confluent portions formed by continuous phase inlet channels and dispersion phase inlet channels. The rate of liquid supply was 20 μl/min for both the dispersion phase and the continuous phase. Under a condition that the rate of liquid supply was steady for the both, the production of fine particles was observed at the confluent portions, at which the dispersion phase and the continuous phase join, of the fine channel device. In the observation of the thus produced fine particles, the averaged particle size was 180 μm and the CV value (%) indicating the degree of dispersion of particle size was 8.7% in the case that the confluent portion had an angle of 22°, and the averaged particle size was 160 μm and the CV value (%) indicating the degree of dispersion of particle size was 9.2% in the case of the angle of 44°. Further, in the observation of the produced fine particles when the rates of liquid supply for the dispersion phase and the continuous phase were both 5 μl/min, the averaged particle size was 250 μm and the CV value (%) indicating the degree of dispersion of particle size was 9.4% in the case that the confluent portion had an angle of 22°, and the averaged particle size was 220 μm and the CV value (%) indicating the degree of dispersion of particle size was 8.5% in the case of 44°. The particle size of the fine particles in the case of the confluent portion having an angle of 22° was 0.89 times as much as the particle size in the case of the confluent portion having an angle of 44°. Thus, it is possible to control the particle size by simply changing the angle at the confluent portion in the fine channel, without changing the rate of supply to the dispersion phase and the continuous phase.

Comparative Example 1

Figure 26A:
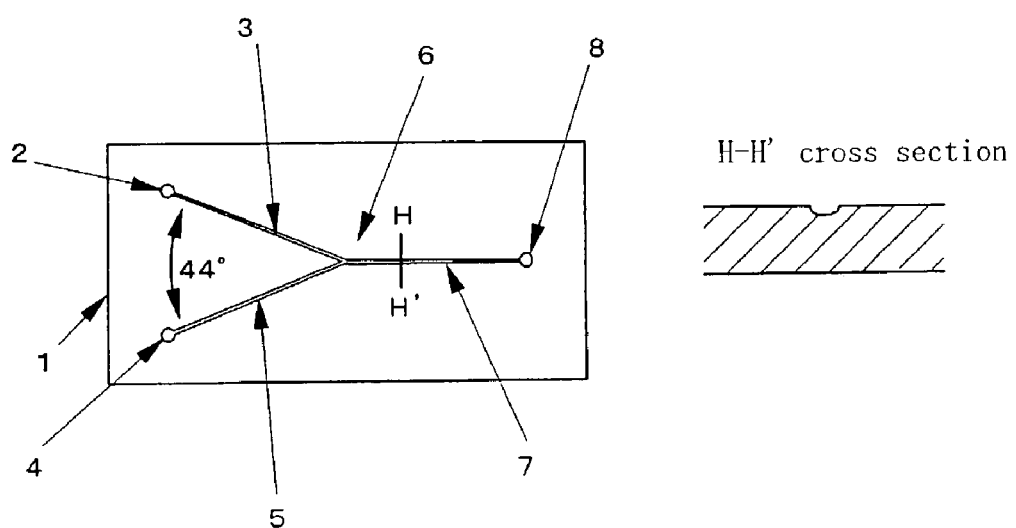
FIG. 26(a) is a schematic view showing a fine channel according to Comparative Example 1.
Figure 26B:
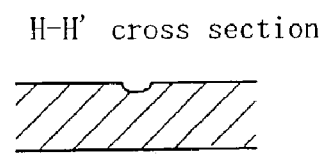
FIG. 26(b) is an enlarged cross-sectional view taken along a line H–H' in FIG. 26(a)

FIG. 26 shows a fine channel according to Comparative Example 1. The fine channel was formed in a Y-letter like form in a surface of a Pyrex (trademark) glass of 70 mm×20 mm×1 t (thickness) in which a continuous phase inlet channel 3, a dispersion phase inlet channel 5 and an outlet channel 7 had respectively a width of 130 μm, a depth of 35 μm and an aspect ratio of fine channel of 0.27, wherein the length of the outlet channel was 30 mm and the Y-letter like channel had a confluent portion having an angle of 44° which was formed by joining the continuous phase inlet channel and the dispersion phase inlet channel. A fine channel device was prepared in the same manner as Example 1.

Then, the fine channel device was held by holders; a mixed solution of divinylbenzene and butyl acetate as a dispersion phase for producing fine particles and a 3% aqueous solution of polyvinyl alcohol as a continuous phase were injected into micro syringes, and the liquid supply was conducted in the same manner as Example 1. The rate of liquid supply was 5

µl/min for both the dispersion phase and the continuous phase. Under a condition that the rate of liquid supply was steady for the both, when the confluent portion, at which the dispersion phase and the continuous phase joined, of the fine channel device was observed, there occurred separation and agglomeration in the outlet channel although the production of fine particles could be observed. In the observation of the produced fine particles, the CV value (%) indicating the degree of dispersion of particle size was 36.5% which showed fine particles having a bad degree of dispersion. In order to produce fine particles having an excellent degree of dispersion in the fine channel device having the above-mentioned aspect ratio, it is necessary to supply the continuous phase in an excessive amount at a rate of liquid supply of continuous phase>dispersion phase, specifically, at a flow current ratio of 5:1 or more.

Example 3

Figure 27A:
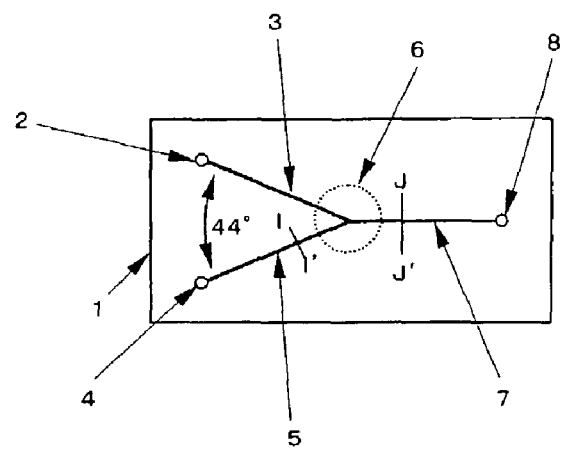
FIG. 27(a) is a schematic view showing a fine channel according to Example 3.
Figure 27B:
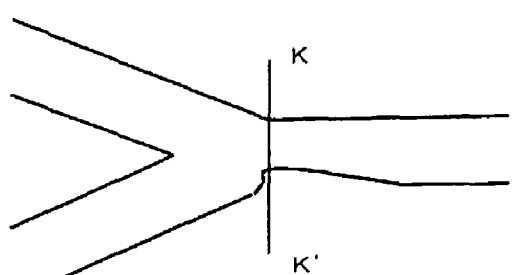
FIG. 27(b) is an enlarged view of the portion indicated by numeral 6.

FIG. 27(a) shows a fine channel according to a third example of the present invention. The fine channel was formed in a Y-letter like form, which had a projection at a portion in an outlet channel as shown in an enlarged view of FIG. 27(b), in a surface of a Pyrex (trademark) glass of 70 mm×40 mm×1 t (thickness) in which a continuous phase inlet channel 3, a dispersion phase inlet channel 5 and an outlet channel 7, which correspond to the fine channel, had respectively a width of 146 µm, a depth of 55 µm and an aspect ratio of fine channel of 0.38, wherein the length of the outlet channel was 30 mm and the Y-letter like channel had a confluent portion having an angle of 44° which was formed by joining the continuous phase inlet channel and the dispersion phase inlet channel. Although the width and the depth of the fine channel depend on the particle size of fine particles to be produced, the aspect ratio of the fine channel should not be deviated from a range of from 0.30 to less than 3.0. The size of the projection can be changed in consideration of the particle size of fine particles and the performance of a pump with respect to an inner pressure of the fine channel. In this Example, however, the width of the fine channel taken along a line K–K' in FIG. 27(b) was determined to be 116 µm. A fine channel device having such fine channel was prepared in the same manner as Example 1.

Figure 27C:
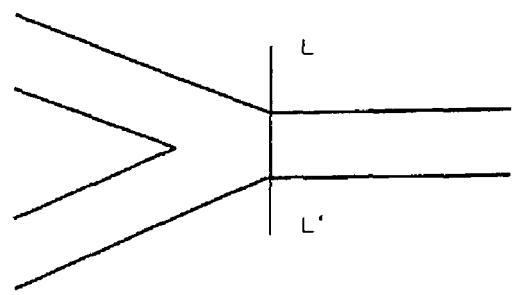
FIG. 27(c) is a schematic view showing Comparative Example in which the fine channel has no projection.

Then, the fine channel device was held by holders; a mixed solution of divinylbenzene and butyl acetate as a dispersion phase to produce fine particles and a 3% aqueous solution of polyvinyl alcohol as a continuous phase were injected into micro syringes, and the liquid supply was conducted by micro syringe pumps in the same manner as Example 1. Comparison was made by using a fine channel without having any projection at or around the confluent portion at the joint portion of the continuous phase inlet channel, the dispersion phase inlet channel and the outlet channel as shown in FIG. 27(c). The rate of liquid supply was the same for both the dispersion phase and the continuous phase. In the measurement of flow rates capable of producing fine particles, the flow rate permitting the production of fine particles in the fine channel device having the projection was 10 µl/min, and the flow rate permitting the production of fine particles in the fine channel device without having any projection as shown in FIG. 27(c) was 8 µl/min.

In the observation of thus produced fine particles in the fine channel device having the projection, the averaged particle size was 110 µm and the CV value (%) indicating the degree of dispersion of particle size was 6.3%, which showed an excellent degree of dispersion of particle size. Thus, it is possible to maintain an excellent degree of dispersion and to increase an amount of fine particles to be produced, by providing a projection in the outlet channel.

Example 4

Figure 28A:
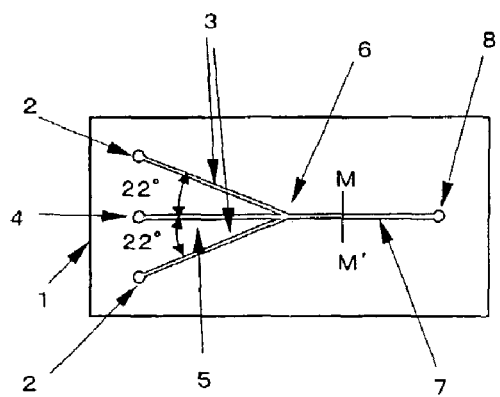
FIG. 28(a) is a schematic view showing a fine channel according to Example 4.
Figure 28B:
FIG. 28(b) is an enlarged cross-sectional view taken along a line M–M' in FIG. 28(a)

FIG. 28(a) shows a fine channel according to a fourth example of the present invention. The fine channel, formed in a surface of a Pyrex (trademark) glass of 70 mm×20 mm×1 t (thickness) was comprised of two continuous phase inlet channels 3, a single dispersion phase inlet channel 5 and an outlet channel 7, which correspond to the fine channel, each having a width of 140 µm, a depth of 60 µm and an aspect ratio of fine channel of 0.43, wherein the length of the outlet channel was 30 mm and the fine channel had confluent portions each having an angle of 22°, which were formed so as to clip the single dispersion phase inlet channel by the two continuous phase inlet channels. Although the width and the depth of the fine channel depend on the particle size of fine particles to be produced, the aspect ratio of the fine channel should not be deviated from a range of from 0.30 to less than 3.0. A fine channel device was prepared in the same manner as Example 1.

Then, the fine channel device was held by holders; a mixed solution of divinylbenzene and butyl acetate as a dispersion phase for producing fine particles and a 3% aqueous solution of polyvinyl alcohol as a continuous phase were injected into micro syringes, and liquid supply was conducted by micro syringe pumps in the same manner as Example 1. The dispersion phase was introduced from the dispersion phase inlet channel 5 located at an intermediate position, and the continuous phases were introduced from the two continuous phase inlet channels 3 located at both sides of the dispersion phase inlet channel 5. The rate of liquid supply was 6 µl/min for both the dispersion phase and the continuous phase. Under a condition that the rate of liquid supply was steady, the production of fine particles was observed at the confluent portions where the dispersion phase and the continuous phase joined, in the fine channel device. In the observation of the produced fine particles, the averaged particle diameter was 77 µm and the CV value (%) indicating the degree of dispersion of particle size was 7.0%, which showed extremely uniform fine particles.

Example 5

As a fifth example, a fine channel device having four channels as shown in FIG. 29(a) was prepared. The fine channel device had a fine channel 16 having a width of 100 µm and depth of 40 µm, and had a fluid inlet port A (43), a fluid inlet port B(44), a fluid inlet port C(45), a laminar flow channel 46 communicated with fluid inlet ports 43, 44 and fine channels 3, 5 communicated with laminar flow channel 46 wherein the fine channels 3, 5 were joined to the laminar flow channel at angles of 44° respectively. The fine channel device having the fine channels was prepared in the same manner as Example 1. A mixed solution of divinylbenzene of an organic phase and butyl acetate, as a dispersion phase was supplied from the fluid inlet port A(43), a 3% aqueous solution of polyvinyl alcohol of aqueous phase was supplied from the fluid inlet port B(44), and a 3% aqueous solution of polyvinyl alcohol of aqueous phase as a continuous phase was supplied from the fluid inlet port C(45). These phases were injected into micro syringes and the liquid supply was conducted by micro syringe pumps in the same manner as Example 1. The liquid supply was conducted at flow rates of 5 µl/min from the fluid inlet port A and the fluid inlet port B, and at a flow rate of 10 µl/min from the fluid inlet port C. When the rate of liquid supply became steady for all, a laminar flow was observed in a position from a confluent portion 47 of the laminar flow channel communicated with the fluid inlet port A and the fluid inlet port B, to the confluent portion 6. Further, the production of fine particles was observed at the confluent portion of the continuous phase. In the observation of the produced fine particles, the averaged particle diameter was 110 µm and the CV value (%) indicating the degree of dispersion of particle size was 8.2%, which showed uniform fine particles.

Example 6

FIG. 20 shows a fine channel according to a sixth example of the present invention. A Y-letter like channel was formed in a surface of a Pyrex (trademark) glass of 70 mm×20 mm×1 t (thickness) in which a continuous phase inlet channel 3, a dispersion phase inlet channel 5 and an outlet channel 7, which correspond to the fine channel, had respectively a width of 220 µm, a depth of 80 µm and an aspect ratio of fine channel of 0.36, wherein the length of the outlet channel was 30 mm and the Y-letter like channel had a confluent portion having an angle of 44° which was formed by the continuous phase inlet channel and the dispersion phase inlet channel. Although the width and the depth of the fine channel depend on the particle size of produced fine droplets or fine particles, the aspect ratio of fine channel should not be deviated from a range of from 0.30 to less than 3.0.

A mixed solution of divinylbenzene and butyl acetate as a dispersion phase for producing fine particles and a 3% aqueous solution of polyvinyl alcohol as a continuous phase were injected into micro syringes, and the liquid supply was conducted by micro syringe pumps in the same manner as Example 1. Rates of liquid supply were 2 µl/min for both the dispersion phase and the continuous phase. When the rates of liquid supply became steady for both, the production of fine particles was observed at the confluent portion of the fine channel device at which the dispersion phase and the continuous phase joined. After the fine particles have been produced, the irradiation of ultraviolet rays 21 having the center of the light irradiation spot 20 was conducted to a position in the outlet channel 7, which was 10 mm apart from the outlet port 8 to thereby harden the fine particles, as shown in FIG. 8(b). The size of the light irradiation spot 20 was about 10 mm in diameter. A mask was disposed to prevent the position other than the light irradiation spot 20 from light irradiation. The fine particles as a medium of the aqueous solution of polyvinyl alcohol were discharged from the outlet port 8. In the observation of the produced fine particles, the averaged particle size was 200 µm and the CV value (%) indicating the degree of dispersion of particle size was 8.5% which showed extremely uniform fine particles.

On the other hand, after the fine particles have been produced in the fine channel, the fine particles were hardened by heating them at 65° C. with a heater 28, instead of the irradiation of light, at a portion of a Teflon (trademark) tube 27 extending from the outlet port 8 to the outside of the fine channel device as shown in FIG. 9(a). The produced fine particles as the medium of the aqueous solution of polyvinyl alcohol were discharged into a beaker 26. In the observation of the produced fine particles, the averaged particle size was 200 µm and the CV value (%) indicating the degree of dispersion of particle size was 8.5% which showed extremely uniform particles.

Example 7

Figure 30:
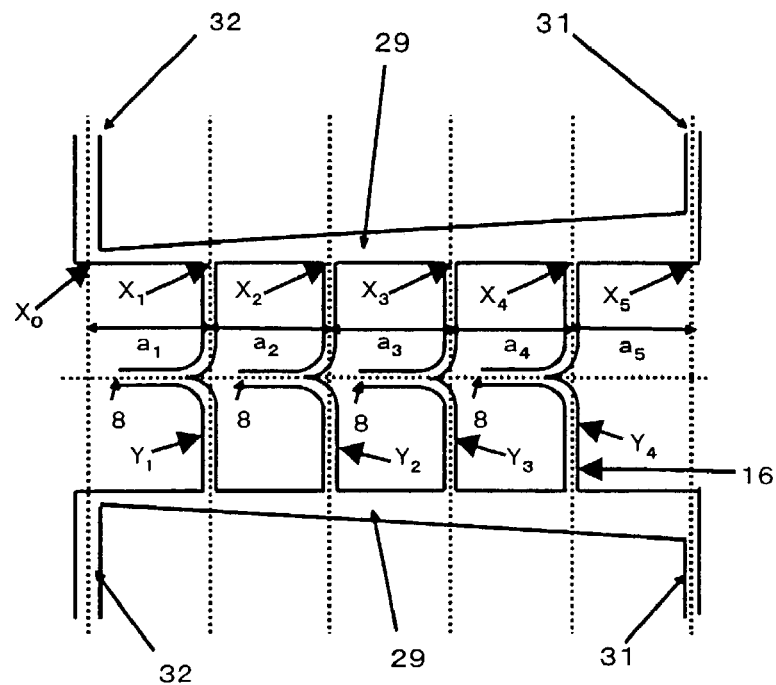
FIG. 30 is a schematic view showing an arrangement of fine channels according to Example 7.

In Example 7, a fine channel device having fine channels 16 as shown in FIG. 30 was prepared. The fine channel device was composed of two common channels 29 each having a channel depth of 80 µm and a channel width of 0.5 mm at the position of a common channel inlet port 32 wherein the channel width was gradually increased from the position of the common channel inlet port 32 toward a common channel outlet port 31 at which the channel width reached 2 mm. The fine channels 16 had a width of 220 µm and a depth of 80 µm, and the fine channels were drawn from the common channels 29 to form 4 Y-letter like confluent portions which were arranged with equal intervals of 6 mm (i.e., distances $a_1$ to $a_5$ were all 6 mm), the shape of each y-letter like fine channel was the same as in Example 1. The width and the depth of the common channel inlet ports were respectively 0.5 mm and 80 µm, and the width and the depth of the common channel outlet ports 31 were respectively 200 µm and 80 µm. The fine channel device having these fine channels was prepared by the same method as in Example 1.

To each of the two common channels of the fine channel device, pure water was fed at a flow rate of 2.5 ml/min for 5 min through the respective common channel inlet ports in the same manner as Example 1. When amounts of the liquid discharged from the common channel outlet ports through the Y-letter like fine channels were compared, a result as shown in Table 1 was obtained. The liquid could be fed uniformly to the fine channels $Y_1$ to $Y_4$.

TABLE 1

|  | Example 7 | Comparative Example 2 |
| --- | --- | --- |
| Amount of discharge $Y_1$ (ml) | 1.02 | 1.14 |
| Amount of discharge $Y_2$ (ml) | 1.01 | 0.96 |
| Amount of discharge $Y_3$ (ml) | 1.00 | 0.83 |
| Amount of discharge $Y_4$ (ml) | 1.00 | 0.68 |
| Average (ml) | 1.01 | 0.90 |
| Standard deviation (ml) | 0.01 | 0.20 |
| CV (%) | 0.95 | 21.64 |

On the other hand, a 3% aqueous solution of polyvinyl alcohol was fed to a common channel at a flow rate of 100 µl/min, and a mixed solution of divinylbenzene and butyl acetate to the other common channel at the same flow rate in the same manner as Example 1. When particle diameters of 10 fine particles produced in each of the fine channels were measured with a microscope and the diameters obtained by measuring were averaged, a result as shown in Table 2 was obtained. It was found that the averaged value of the diameters of the fine particles discharged from the fine channels was 101.0 and the CV value (%) indicating the degree of dispersion of particle size was 8.7%. Thus, uniform fine particles could be produced in each of the fine channels.

TABLE 2

|  | Example 7 | Comparative Example 2 |
| --- | --- | --- |
| Particle diameter of droplets $Y_1$ (µm) | 95 | 86 |
| Particle diameter of droplets $Y_2$ (µm) | 109 | 104 |

TABLE 2-continued

|  | Example 7 | Comparative Example 2 |
|---|---|---|
| Particle diameter of droplets $Y_3$ (µm) | 100 | 122 |
| Particle diameter of droplets $Y_4$ (µm) | 100 | 140 |
| Average (µm) | 101.0 | 113.0 |
| Standard deviation (µm) | 5.83 | 23.24 |
| CV (%) | 5.77 | 20.56 |

Comparative Example 2

Figure 31:
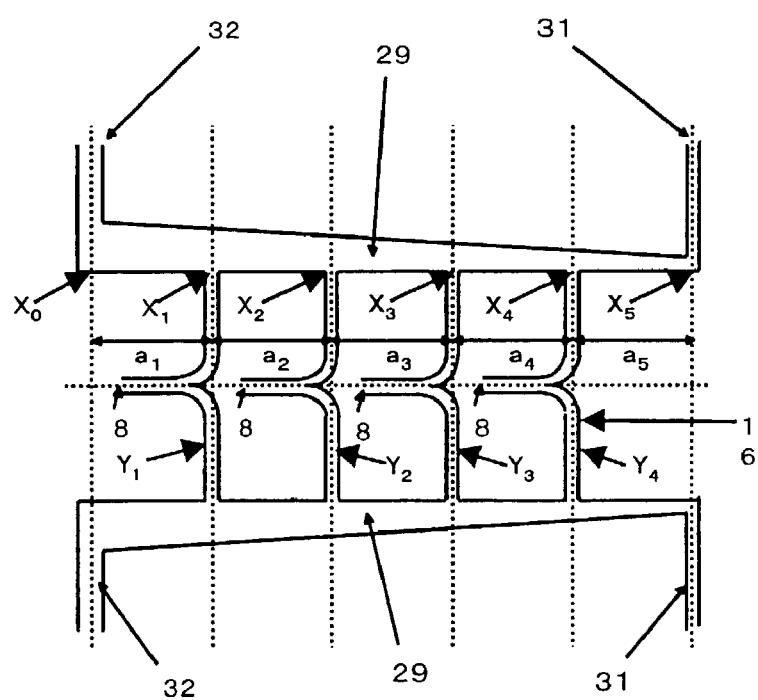
FIG. 31 is a schematic view showing an arrangement of fine channels in Comparative Example 2.
Figure 32A:
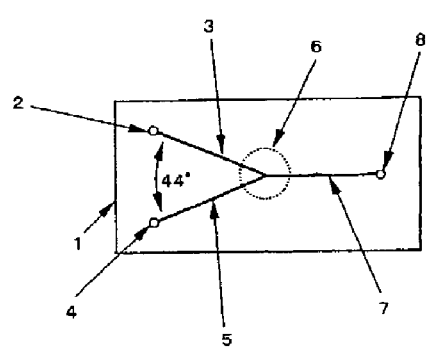
FIG. 32(a) is a conceptual diagram of a fine channel having at least one projection in a circled portion indicated by a reference numeral 6.
Figure 32B:
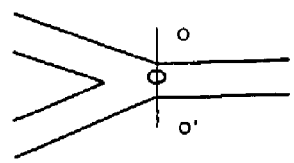
FIG. 32(b) is an enlarged view of the circled portion 6 in FIG. 32(a)
Figure 32C:
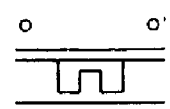
FIG. 32(c) is an enlarged cross-sectional view taken along a line O–O' in FIG. 32(b)
Figure 32D:
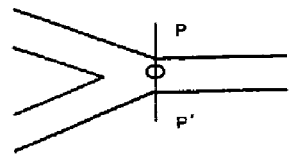
FIG. 32(d) is an enlarged view of the circled portion 6 in FIG. 32(a)
Figure 32E:
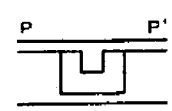
FIG. 32(e) is an enlarged cross-sectional view taken along a line P–P' in FIG. 32(d)
Figure 32F:
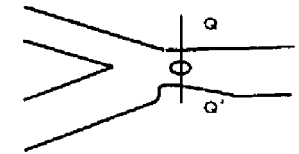
FIG. 32(f) is an enlarged view of the circled portion 6 in FIG. 32(a)
Figure 32G:
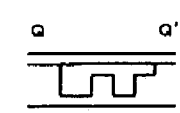
FIG. 32(g) is an enlarged cross-sectional view taken along a line Q–Q' in FIG. 32(f)
Figure 32H:
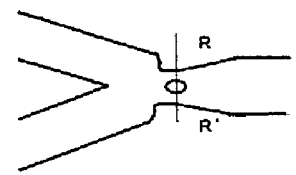
FIG. 32(h) is an enlarged view of the circled portion 6 in FIG. 32(a)
Figure 32I:
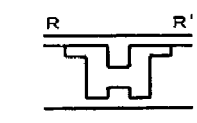
FIG. 32(i) is an enlarged cross-sectional view taken along a line R–R' in FIG. 32(h).

In Comparative Example 2, a fine channel device having fine channels 16 as shown in FIG. 31 was prepared. The fine channel device was composed of two common channels 29 each having a channel depth of 80 µm and a channel width of 2 mm at the position of a common channel inlet port 32 wherein the channel width was gradually narrowed from the common channel inlet port 32 toward a common channel outlet port 31 at which the channel width reached 0.5 mm. The fine channels were of 220 µm wide and 80 µm, and the fine channels were drawn from the common channels 29 to form 4 Y-letter like confluent portions which were arranged with equal intervals of 6 mm (i.e., distances $a_1$ to $a_5$ were all 6 mm). The shape of the fine channels was the same as in Example 1. The width and the depth of the common channel inlet ports were respectively 0.5 mm and 80 µm, and the width and the depth of the common channel outlet ports were respectively 220 µm and 80 µm. The fine channel device having these fine channels was prepared by the same method as in Example 1.

To each of the two common channels of the fine channel device, pure water was fed at a flow rate of 2.5 ml/min for 5 min through the respective common channel inlet ports by using liquid supply pumps in the same manner as Example 1. When amounts of the liquid discharged from the common channel outlet ports through the Y-letter like fine channels were compared, a result as shown in Table 1 was obtained. The liquid could not be fed uniformly to the fine channels $Y_1$ to $Y_4$.

On the other hand, a 3% aqueous solution of polyvinyl alcohol was fed to a common channel at a flow rate of 100 µl/min and a mixed solution of divinylbenzene and butyl acetate to the other common channel at the same flow rate by using liquid supply pumps in the same manner as Example 1. When particle diameters of 10 fine particles produced in fine channels were measured with a microscope and the particle diameters obtained by measuring were averaged, a result as shown in Table 2 was obtained. It was found that fine particles having a uniform particle diameter could not be produced in the fine channels.

Example 8

In an eighth example, a fine channel device having a fine channel as shown in FIG. 20 was prepared. The fine channel device was prepared by the same method as in Example 1 except that the width W of the fine channel was 220 µm, the depth d of the fine channel was 80 µm and the length of the fine channel was 30 mm wherein two inlet channels 3,5 communicated with two inlet ports 2,4 were joined at an angle of 44°.

An aqueous phase containing phenol as a material to be extracted was fed from a fluid inlet port of the fine channel and an organic phase containing ethyl acetate as an extracting solvent was fed from the other fluid inlet port by the same method as in Example 1. Experiments was conducted as to a case that a laminar flow was formed by adjusting liquid supply rates to extract the phenol into the ethyl acetate and a case that the organic phase of ethyl acetate was extracted as fine particles in the aqueous phase. The liquid supply rates to form the laminar flow were 20 µl/min for both the aqueous phase and the organic phase. The liquid supply rates in the case of extracting the organic phase of divinylbenzene as fine particles in the aqueous phase were 2 µl/min for both the aqueous phase and the organic phase.

The specific interfacial area obtained by forming a laminar flow in this fine channel was $2\times10^4/W$ (cm$^{-1}$)=about $2\times10^4/220$ (cm$^{-1}$)=about 90 (cm$^{-1}$) because the width W of the fine channel was about 220 µm. Further, when the averaged particle diameter of the fine particles in the case of forming the organic phase of ethyl acetate into fine particles in the aqueous phase was measured by using a high-speed camera, the diameter D of the fine particles was about 200 µm. The specific interfacial area in this case was $6\times10^4/D$ (cm$^{-1}$)=about $6\times10^4/200$ (cm$^{-1}$)=about 300 (cm$^{-1}$). It is estimated from the fact that the specific interfacial area of the case that the organic phase of ethyl acetate is formed into fine particles in the aqueous phase is larger than the case that the laminar flow is formed between the aqueous phase and the organic phase, whereby the efficiency of extraction can be improved.

Actually, the fluid discharged from the fluid outlet port was recovered in a test tube, only the organic phase was taken out, and the concentration of phenol was measured by using a high-speed liquid chromatography. As a time in which the organic phase is in contact with the aqueous phase is longer, an amount of a material to be extracted is increased. Accordingly, correction was made by dividing a value obtained from the test result by a stay time of the organic phase as an extracting solvent in the fine channel, the stay time being calculated from the liquid supply rate of the organic phase. As a result, it was found that the case that the organic phase of ethyl acetate was formed into fine particles to be extracted, showed a high concentration of phenol. From the above-mentioned, it was confirmed that the efficiency of extraction could be improved more than the efficiency determined by the width of the fine channel, by forming an extracting solvent into fine particles.

According to the fine particle producing method of the present invention, the particle size of fine particles to be produced can be controlled by feeding a dispersion phase and a continuous phase into a fine channel device having a fine channel through inlet channels whereby fine particles are produced by chopping the dispersion phase by the continuous phase at the confluent portion at which the dispersion phase and the continuous phase join, wherein the angle at the confluent portion formed by an inlet channel for feeding the dispersion phase and an inlet channel for feeding the continuous phase is adjusted to a predetermined angle. The producing method of the present invention provides easy control in comparison with a conventional technique that fine particles are produced by changing rates of feeding the dispersion phase and the continuous phase, and the method is suitable for industrial mass production. In particular, by determining the flow rate for feeding the dispersion phase to be substantially equal to the rate for feeding the continuous phase, it is sufficient to prepare only one device for feeding the dispersion phase and the continuous phase, whereby it is advantageous in cost. Accordingly, the fine particle producing method of the present invention can produce fine particles having a uniform particle size without the necessity of feeding the continuous phase excessively as in the conventional technique, and permits cost reduction for the continuous phase when, for example, gel is produced in industrial mass production.

Further, by providing inlet channels for feeding a plurality of dispersion phases and/or continuous phases, a plurality of laminar flows of fluid, mixed solution or emulsion can be formed from the dispersion phases and/or continuous phases, whereby fine particles of a multi-layer structure, fine particles containing a many different kinds of fine particles, composite microcapsules or multiple microcapsules can be produced.

Further, in a case that fine particles produced at the confluent portion in the fine channel are fine droplets to be hardened wherein the particle size of the hardened fine particles is made uniform, the fine droplets after having been discharged from the outlet port through the outlet channel, may successively be hardened in a fine channel extending from the outlet port of the fine channel device to the outside of it. In order to make the particle size of the hardened fine particles to be more uniform, the fine particles may be hardened in the fine channel, i.e., the outlet channel in the fine channel device immediately after the fine droplets have been produced at the confluent portion of the fine channel. This technique can eliminate such disadvantages that when the fine particles produced at the confluent portion of the fine channel are fine droplets, the shape of the fine particles is deformed in a time of collecting them in a beaker at the outside of the fine channel to hardening them, and fluctuation of particle size of the hardened fine particles becomes large due to the agglomeration of fine particles. Further, the present invention can provide fine particles, and can provide fine particles having uniform size. Further, it is possible to separate the hardened fine droplets in a medium.

Further, in order to produce a large amount of fine particles by arranging a large number of fine channels in parallel and/or vertically, there is provided a fine channel device comprising an inlet port for feeding fluid, an outlet port for discharging the fluid, a common channel formed in a substrate to communicate the inlet port with the outlet port, and at least one fine channel communicated with the common channel at a position different from the inlet port or the outlet port, characterized in that the cross-section area or the inner diameter of the common channel is increased gradually from the portion where the inlet port is communicated with the common channel to the portion where the outlet port is communicated with the common channel, or unchanged, whereby it is possible to distribute fluid uniformly in the fine channels arranged in parallel or vertically in the fine channel device.

The fine particles produced by the fine particle producing method of the present invention can be used for, for example, microcapsules for pressure-measuring films, non-carbon (pressure-sensitive) papers, toner, adhesives for seal-lock agents, insulation particles of metal, thermal expansion materials, heating media, photochromic glass, thermochromic materials (thermosensitive liquid crystal, thermosensitive dye), magnetophoretic capsules, agrichemicals, synthetic diet, artificial seeds, aromatic substance, cold cream, lipsticks, capsules for vitamins, activated carbon, capsulated enzymes, DDS (drug delivery system) or the like, and gel of a packing material for a column for high-speed liquid chromatography, gap adjusting materials (spacers) or the like.

Further, in the solvent extraction method using the fine channel device of the present invention, fine particles are used for solvent extraction in the fine channel, whereby efficiency of reaction or extraction can be improved to more than the efficiency determined by the width of the fine channel.

The entire disclosures of Japanese Patent Application No. 2002-123835 filed on Apr. 25, 2002, Japanese Patent Application No. 2002-158093 filed on May 30, 2002 and Japanese Patent Application No. 2002-228470 filed on Aug. 6, 2002 including specifications, claims, drawings and summaries are incorporated herein by reference in their entireties.

What is claimed is:

1. A method, comprising:
providing a fine channel including an inlet port and an inlet channel which feed a dispersion phase, an inlet port and an inlet channel which feed a continuous phase, and an outlet channel and an outlet port which discharge fine particles produced by the dispersion phase and the continuous phase, the inlet channel for feeding the dispersion phase and the inlet channel for feeding the continuous phase are joined directly such that the directions of the lengths of said inlet channels form a first angle, said two inlet channels are connected directly to the outlet channel, at least one of said two inlet channels is connected directly to the outlet channel such that the directions of the lengths of said outlet channel and said at least one of inlet channels form a second angle, wherein the first and second angles are such that the inlet channels and outlet channels exhibit a Y-letter shape, and a projection extends into the outlet channel where the inlet channel for feeding the dispersion phase and the inlet channel for feeding the continuous phase are joined to the outlet channel;
providing the dispersion phase through the inlet port which feeds the dispersion phase and providing the continuous phase through the inlet port which feeds the dispersion phase such that the outlet channel discharges the fine particles produced by the dispersion phase and the continuous phase; and
emitting energy into the outlet channel such that the energy hardens at least a surface of the fine particles.

2. The method according to claim 1, wherein the providing the fine channel includes providing the fine channel with an aspect ratio in cross section (the aspect ratio of depth/width of the channel) from 0.30 to less than 3.0.

3. The method according to claim 1, wherein the providing the fine channel includes providing the fine channel with a width and a depth of the inlet channel for feeding the dispersion phase equal to a width and a depth of the inlet channel for feeding the continuous phase.

4. The method according to claim 1, wherein the providing the fine channel includes providing the fine channel with a width of the inlet channel for feeding the dispersion phase not smaller than a width of the outlet channel.

5. The method according to claim 1, wherein the providing the fine channel includes providing the fine channel with the projection at a side of the inlet channel for the dispersion phase with respect to a joining portion of the outlet channel.

6. The method according to claim 1, wherein the providing the fine channel includes providing the fine channel with at least one projection extended from a bottom surface, an upper surface, and/or a side surface of the fine channel in a vicinity of a portion where the inlet channel for feeding the dispersion phase and the inlet channel for feeding the continuous phase join.

7. The method according to claim 1, wherein the emitting energy includes emitting heat into the outlet channel.

8. The method according to claim 1, wherein the emitting energy includes emitting UV light into the outlet channel.

9. A fine channel devices, comprising:

a fine channel including an inlet port and an inlet channel which feed a dispersion phase, an inlet port and an inlet channel which feed a continuous phase, and an outlet channel and an outlet port which discharge fine particles produced by the dispersion phase and the continuous phase, the inlet channel for feeding the dispersion phase and the inlet channel for feeding the continuous phase are joined directly such that the directions of the lengths of said inlet channels form a first angle, said two inlet channels are connected directly to the outlet channel, and at least one of said two inlet channels is connected directly to the outlet channel such that the directions of the lengths of said outlet channel and said at least one of inlet channels form at a second angle, wherein the first and second angles are such that the inlet channels and outlet channels exhibit a Y-letter shape; and an energy source configured to emit energy into the outlet channel such that the energy hardens at least a surface of the fine particles, wherein a projection extends into the outlet channel where the inlet channel for feeding the dispersion phase and the inlet channel for feeding the continuous phase are joined to the outlet channel.

10. The fine channel device according to claim 1, wherein the aspect ratio in cross section of the fine channel (the aspect ratio of depth/width of the fine channel) is from 0.30 to less than 3.0.

11. The fine channel device according to claim 9, wherein a width and a depth of the inlet channel for feeding the dispersion phase are equal to a width and a depth of the inlet channel for feeding the continuous phase.

12. The fine channel device according to claim 1, wherein in a relation between a width of the inlet channel for feeding the dispersion phase and a width of the outlet channel, the width of the inlet channel is not smaller than the width of the outlet channel.

13. The fine channel device according to claim 1, wherein the projection is at a side of the inlet channel for the dispersion phase with respect to a joining portion of the outlet channel.

14. The fine channel device according to claim 9, wherein the projection is extended from a bottom surface, an upper surface, and/or a side surface of the fine channel in a vicinity of a portion where the inlet channel for feeding the dispersion phase and the inlet channel for feeding the continuous phase join.

15. The fine channel device according to claim 9, wherein in a relation between the width of the inlet channel for feeding the continuous phase and the width of the outlet channel, the width of the inlet channel for feeding the continuous phase is not smaller than the width of the outlet channel.

16. The fine channel device according to claim 1, wherein the energy source is configured to emit heat into the outlet channel.

17. The method according to claim 9, wherein the energy source is configured to emit UV light into the outlet channel.

18. The fine channel device according to claim 9, wherein the first angle is 44 degrees.

* * * * *